US011972492B2

(12) United States Patent
Bomze et al.

(10) Patent No.: US 11,972,492 B2
(45) Date of Patent: *Apr. 30, 2024

(54) MOBILE DEVICE DISTANCE TRACKING

(71) Applicant: MileIQ Inc., San Francisco, CA (US)

(72) Inventors: Daniel S. Bomze, San Francisco, CA (US); Daniel R. Goodwin, New York, NY (US); Howard A. Bomze, San Francisco, CA (US)

(73) Assignee: MileIQ Inc., San Francisco, CA (US)

( * ) Notice: Subject to any disclaimer, the term of this patent is extended or adjusted under 35 U.S.C. 154(b) by 204 days.

This patent is subject to a terminal disclaimer.

(21) Appl. No.: 17/328,493

(22) Filed: May 24, 2021

(65) Prior Publication Data

US 2021/0279815 A1 Sep. 9, 2021

Related U.S. Application Data

(63) Continuation of application No. 15/628,395, filed on Jun. 20, 2017, now Pat. No. 11,017,481, which is a
(Continued)

(51) Int. Cl.
*G06Q 40/12* (2023.01)
*G01C 21/36* (2006.01)
(Continued)

(52) U.S. Cl.
CPC ......... *G06Q 40/12* (2013.12); *G01C 21/3697* (2013.01); *G06Q 30/0284* (2013.01);
(Continued)

(58) Field of Classification Search
None
See application file for complete search history.

(56) References Cited

U.S. PATENT DOCUMENTS 6,115,655 A * 9/2000 Keith ................ G01C 21/26
701/467
6,741,933 B1 5/2004 Glass
(Continued)

FOREIGN PATENT DOCUMENTS

| CN | 1754084 A | 3/2006 |
| CN | 102279732 A | 12/2011 |

(Continued)

OTHER PUBLICATIONS

Australian Office Action issued in AU Patent Applicatin No. 2015267788, dated Nov. 13, 2020, pp. 7.
(Continued)

*Primary Examiner* — Fateh M Obaid
(74) *Attorney, Agent, or Firm* — Dinsmore & Shohl LLP

(57) ABSTRACT

In an example, the present invention provides a method for capturing vehicle mileage information. The method includes initiating an application program configured on the mobile wireless device without any user input required to start tracking a drive. The method includes initiating movement of the mobile wireless device. The method includes using a mapping module to track a start point of a route for the mobile wireless device. The method includes moving the mobile wireless device from the start point through one or more legs. The method includes using algorithms or traffic data to identify one or more of the legs as a route or drive.

20 Claims, 16 Drawing Sheets

Flow Diagram of App Navigation

Related U.S. Application Data continuation of application No. 14/449,965, filed on Aug. 1, 2014, now Pat. No. 9,721,305.

(51) Int. Cl.
*G06Q 30/0283* (2023.01)
*G06Q 40/10* (2023.01)
*H04W 4/02* (2018.01)
*H04W 4/029* (2018.01)

(52) U.S. Cl.
CPC ............ *G06Q 40/10* (2013.01); *H04W 4/027* (2013.01); *H04W 4/029* (2018.02)

(56) References Cited

U.S. PATENT DOCUMENTS

| | | |
|---|---|---|
| 7,908,191 B1 | 3/2011 | Dinamani et al. |
| 9,305,317 B2 | 4/2016 | Grokop et al. |
| 9,386,447 B2 | 7/2016 | Tibbitts et al. |
| 9,615,213 B2 | 4/2017 | Tibbitts et al. |
| 10,225,683 B1 | 3/2019 | Howard |
| 2003/0088348 A1 | 5/2003 | Gustavsson et al. |
| 2003/0224806 A1 | 12/2003 | Hebron |
| 2006/0200286 A1 | 9/2006 | Kumagai et al. |
| 2007/0063850 A1* | 3/2007 | Devaul ................ A61B 5/0024 340/573.1 |
| 2007/0067104 A1 | 3/2007 | Mays |
| 2007/0150137 A1 | 6/2007 | Graham |
| 2007/0150139 A1 | 6/2007 | Hardy |
| 2007/0182531 A1 | 8/2007 | Kuchler |
| 2008/0125959 A1 | 5/2008 | Doherty et al. |
| 2008/0200251 A1 | 8/2008 | Alderucci et al. |
| 2009/0150118 A1 | 6/2009 | Naima |
| 2010/0063904 A1 | 3/2010 | Ronen et al. |
| 2010/0102997 A1 | 4/2010 | Pikolon |
| 2010/0235024 A1 | 9/2010 | Uchida |
| 2011/0022349 A1* | 1/2011 | Stirling ................ A61B 5/1038 702/141 |
| 2011/0112717 A1 | 5/2011 | Resner |
| 2011/0126119 A1 | 5/2011 | Young et al. |
| 2011/0172895 A1 | 7/2011 | Fukumoto et al. |
| 2011/0178702 A1 | 7/2011 | Lassesson et al. |
| 2011/0238457 A1 | 9/2011 | Mason et al. |
| 2012/0010867 A1* | 1/2012 | Eder ...................... G16H 50/50 703/13 |
| 2012/0116559 A1* | 5/2012 | Davis .................. G06F 3/04886 700/94 |
| 2012/0130636 A1 | 5/2012 | Westerlage |
| 2012/0154633 A1* | 6/2012 | Rodriguez ........ H04M 1/72454 707/769 |
| 2012/0185419 A1 | 7/2012 | Kuhn et al. |
| 2012/0208592 A1* | 8/2012 | Davis .................... H04N 23/635 705/26.1 |
| 2012/0210233 A1* | 8/2012 | Davis ...................... G06F 3/162 715/727 |
| 2012/0224743 A1* | 9/2012 | Rodriguez .............. G06T 11/60 382/103 |
| 2012/0275642 A1* | 11/2012 | Aller ................... G06F 3/04886 382/100 |
| 2012/0277893 A1* | 11/2012 | Davis ..................... H04N 21/00 700/94 |
| 2012/0284012 A1* | 11/2012 | Rodriguez .............. G06F 3/017 455/556.1 |
| 2012/0330869 A1* | 12/2012 | Durham ................. G06N 5/022 706/16 |
| 2013/0041521 A1* | 2/2013 | Basir ...................... B60R 25/33 701/1 |
| 2013/0084847 A1 | 4/2013 | Tibbitts et al. |
| 2013/0090090 A1 | 4/2013 | Rivere |
| 2013/0090966 A1 | 4/2013 | Rivere |
| 2013/0122937 A1 | 5/2013 | Meyer et al. |
| 2013/0132246 A1* | 5/2013 | Amin .................... G06Q 10/02 705/34 |
| 2013/0324164 A1 | 12/2013 | Vulcano |
| 2014/0113619 A1 | 4/2014 | Tibbitts et al. |
| 2014/0128105 A1 | 5/2014 | Su et al. |
| 2014/0214750 A1 | 7/2014 | Healy et al. |
| 2014/0309870 A1 | 10/2014 | Ricci et al. |
| 2015/0120336 A1 | 4/2015 | Grokop et al. |
| 2015/0177011 A1 | 6/2015 | Ibrahimi et al. |
| 2015/0198722 A1 | 7/2015 | Ben-Akiva et al. |
| 2015/0233718 A1 | 8/2015 | Grokop |
| 2016/0035042 A1 | 2/2016 | Bomze et al. |
| 2016/0309018 A1 | 10/2016 | Tibbitts et al. |
| 2017/0203767 A1 | 7/2017 | Tibbitts et al. |
| 2018/0032997 A1 | 2/2018 | Gordon et al. |
| 2018/0130095 A1 | 5/2018 | Khoury |

FOREIGN PATENT DOCUMENTS

| | | |
|---|---|---|
| CN | 102853845 A | 1/2013 |
| JP | 2007278911 A | 10/2007 |
| JP | 2009519540 A | 5/2009 |
| JP | 2010140426 A | 6/2010 |
| KR | 101039411 B1 | 6/2011 |
| RU | 2007101480 A | 7/2008 |
| WO | 2008052356 A1 | 5/2008 |
| WO | 2014155110 A1 | 10/2014 |

OTHER PUBLICATIONS

Indian Office Action issued in IN Patent Application No. 201747003434, dated Nov. 22, 2020, pp. 6.
European Office Action issued in EU Patent Application No. 15827884. 6, dated Oct. 20, 2020, pp. 7.
Mexican Office Action issued in MX Patent Application No. MX/a/ 2017/011460, dated Jul. 28, 2020, pp. 5.
Australian Office Action issued iin AU Patent Application No. 2015296778, dated Aug. 5, 2020, pp. 6.
Australian Office Action issued in AU Patent Application No. 2015296778, dated Jun. 12, 2020, pp. 2.
Chinese Office Action issued in CN Patent Application No. 201580041872.5, dated Apr. 13, 2020, pp. 16.
Brazilian Office Action issued in Brazil Patent Application No. BR11201700574.9, dated May 6, 2020, pp. 5.
Australian Office Action issued in AU Patent Application No. 201596778, dated Mar. 20, 2020, pp. 5.
Japanese Office Action issued in JP Patent Application No. 2017526041, dated Jun. 5, 2019, p. 5.
Hodgkins, Kelly "Daily App: Speedtracker Records your Daily Drive So You Don't Have to" retrived from heeps://222.engadget. com/2014/02/26/daily-app-speedtracker-records-your-daily-drive-so-you-don'tha/guccounter=1; pp. 5, Feb. 26, 2014.
TripLog GPS Mileage Tracker User Guide retrived from http:// www.opieaccounting.com/images/TripLogUserGuide.pdf; pp. 53, May 20, 2012.
Russian Office Action issued in RU Patent Application No. 2017103123, dated Feb. 6, 2019, pp. 12.
EU Supplementary Search report issued in EU Patent Application No. 15827884.6, dated Nov. 8, 2017, pp. 8.
Kazmucha, Allyson Best Mileage Tracking Appls for iPhone: Retrived from: https://www.imore.com/best-mileage-tracking-apps-iphone-milege-log-plus-auto-miles-klicks-more; pp. 6, Jun. 24, 2014.
Liao et al. Learning and Interring Transportation Routines, Journal on Artificial Intelligence, vol. 171, issued 5-6, pp. 311-331, Apr. 14, 2007.
U.S. Notice of Allownce issued in U.S. Appl. No. 14/449,965, dated Mar. 27, 2017, pp. 8.
Mexican Office Action issued in MX Application No. MX/a/2017/ 011460, dated Apr. 26, 2017, pp. 2.
U.S. Office Action for U.S. Appl. No. 14/449,964 dated Jan. 17, 2016, Bomze et al., "Mobile Device Distance Tracking" pp. 13.
U.S. Office Action for U.S. Appl. No. 14/449,965 dated Feb. 10, 2016, Bomze et al., "Mobile Device Distance Tracking" pp. 13.
U.S. Office Action for U.S. Appl. No. 14/449,96, dated Apr. 29, 2016, Bomze et al., "Mobile Device Distance Tracking", pp. 14.
U.S. Office Action for U.S. Appl. No. 14/449,965 dated Aug. 6, 2016, Bomze et al., "Mobile Device Distance Tracking", pp. 15.

(56) References Cited

OTHER PUBLICATIONS

U.S. Office Action for U.S. Appl. No. 14/449,965 dated Sep. 1, 2015, Bomze et al., "Mobile Device Distance Tracking", pp. 14.
International Search Report & Written Opinion to corresponding PCT Application No. PCT/US2015/042303 dated Oct. 26, 2015.
Examiner Requisition dated Aug. 17, 2022 pertaining to CA application No. 2955628 filed Jan. 18, 2017, pp. 1-6.

* cited by examiner

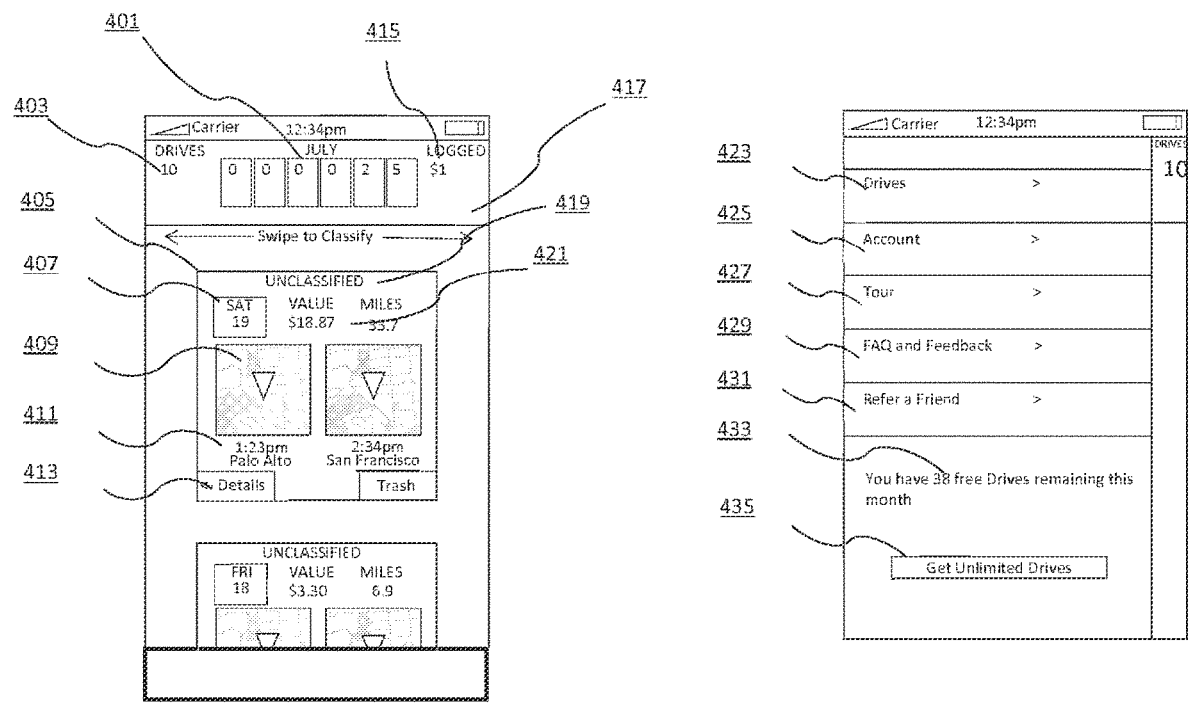
Figure 4A: Flow Diagram of App Navigation

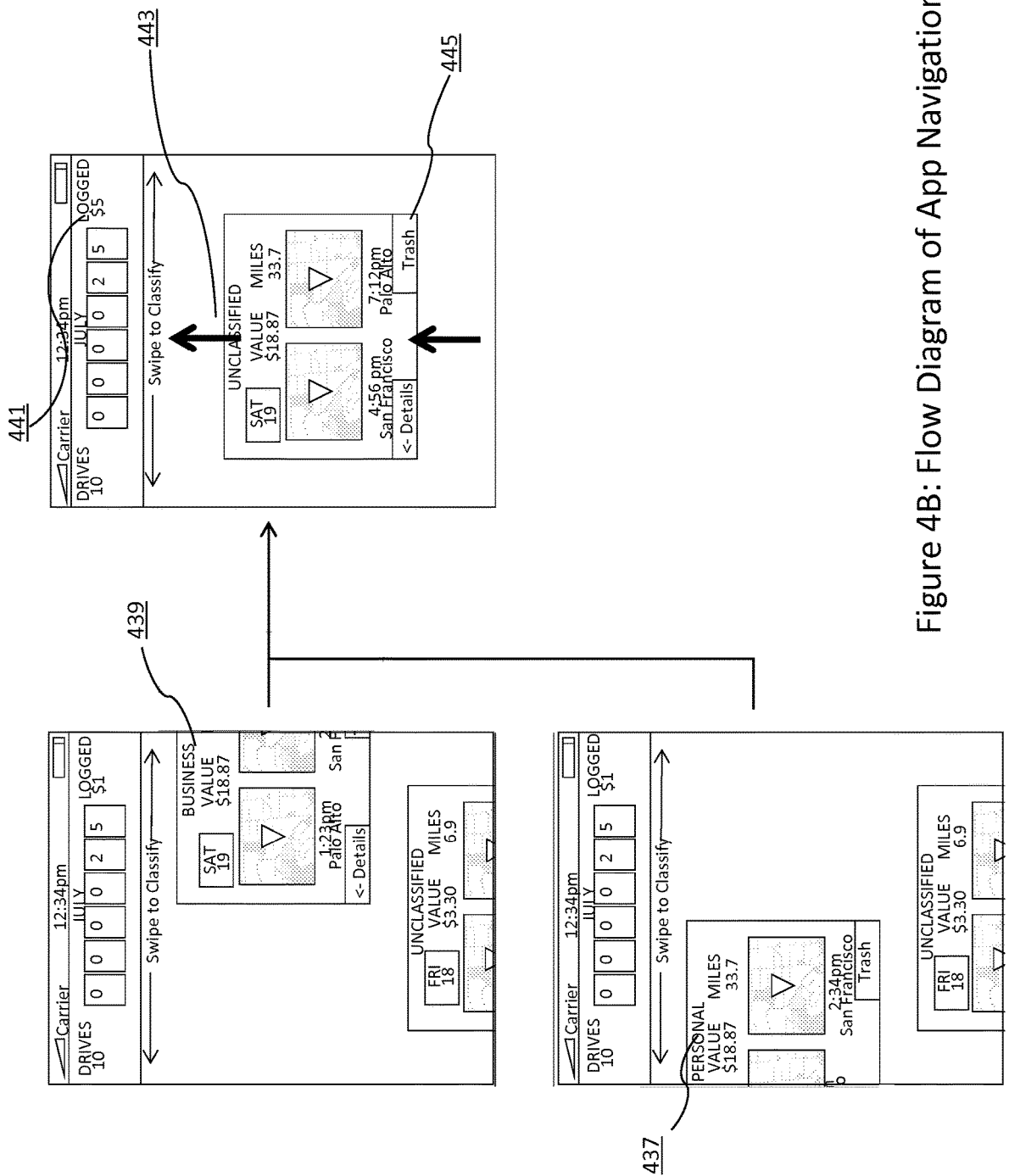
Figure 4B: Flow Diagram of App Navigation

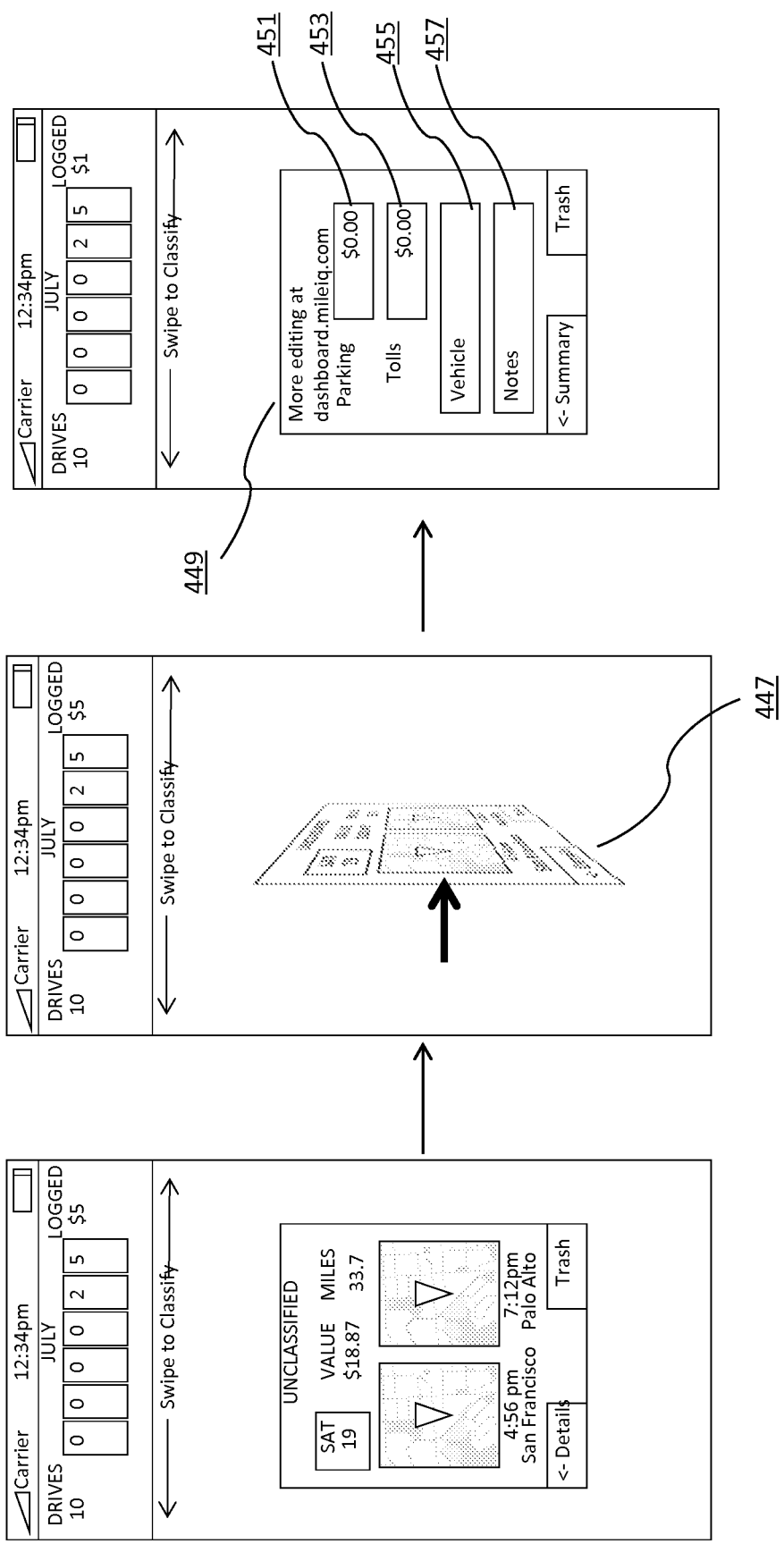
Figure 4C: Flow Diagram of App Navigation

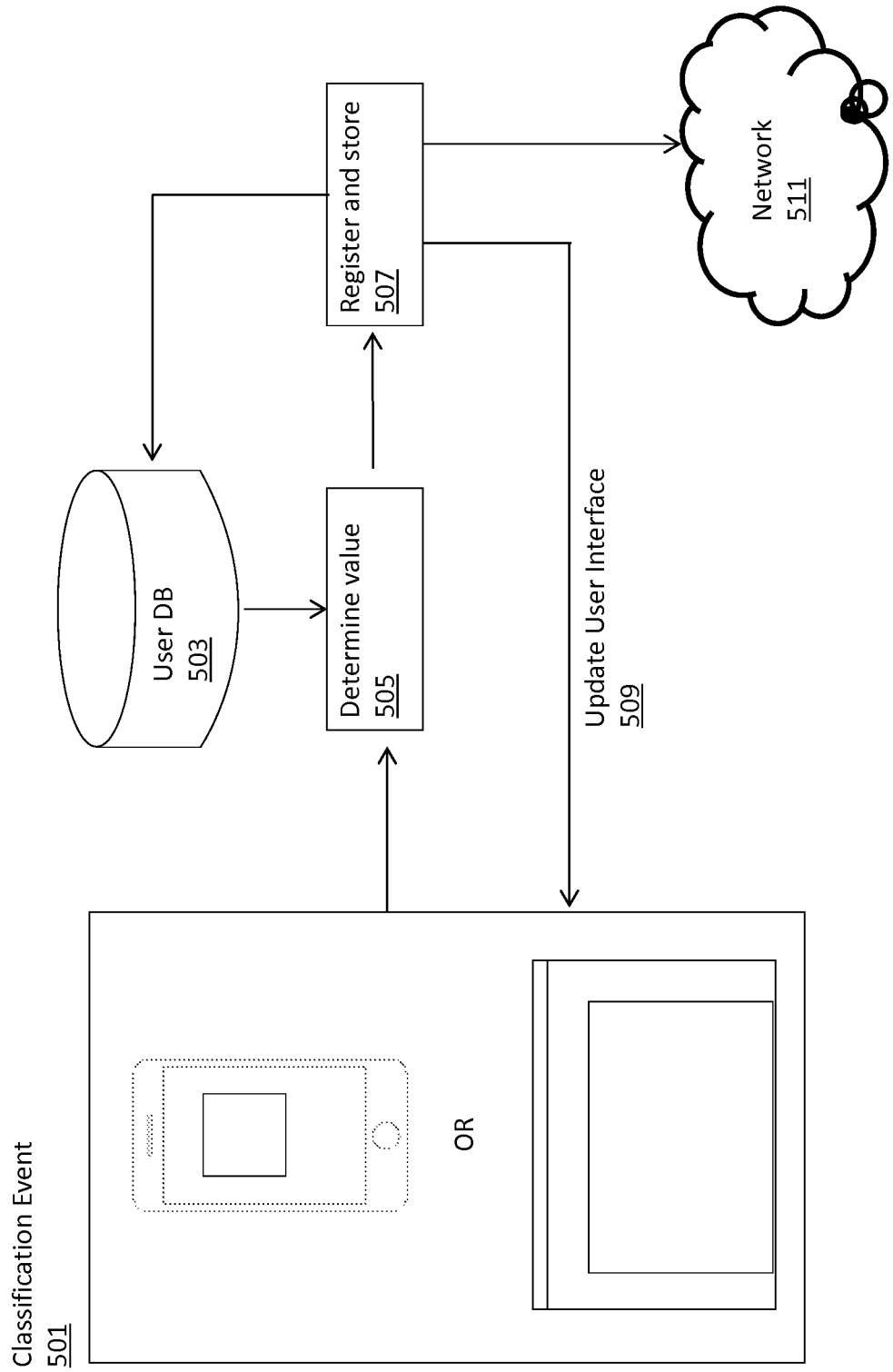

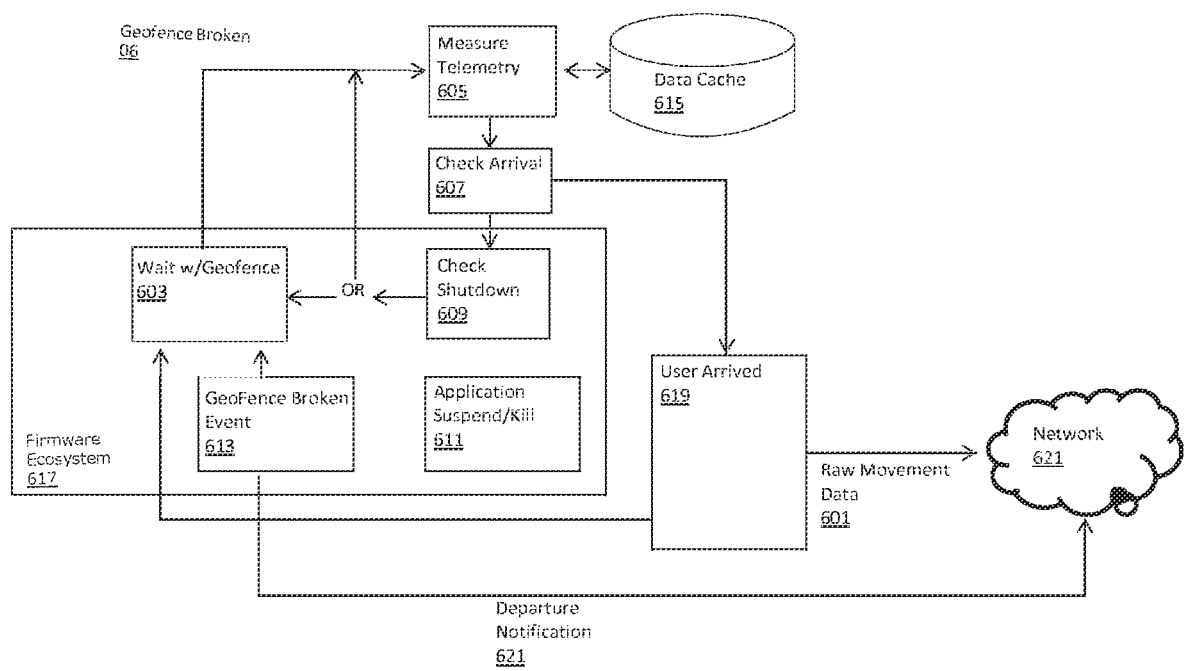
Figure 6: Flow Diagram of capturing drive data

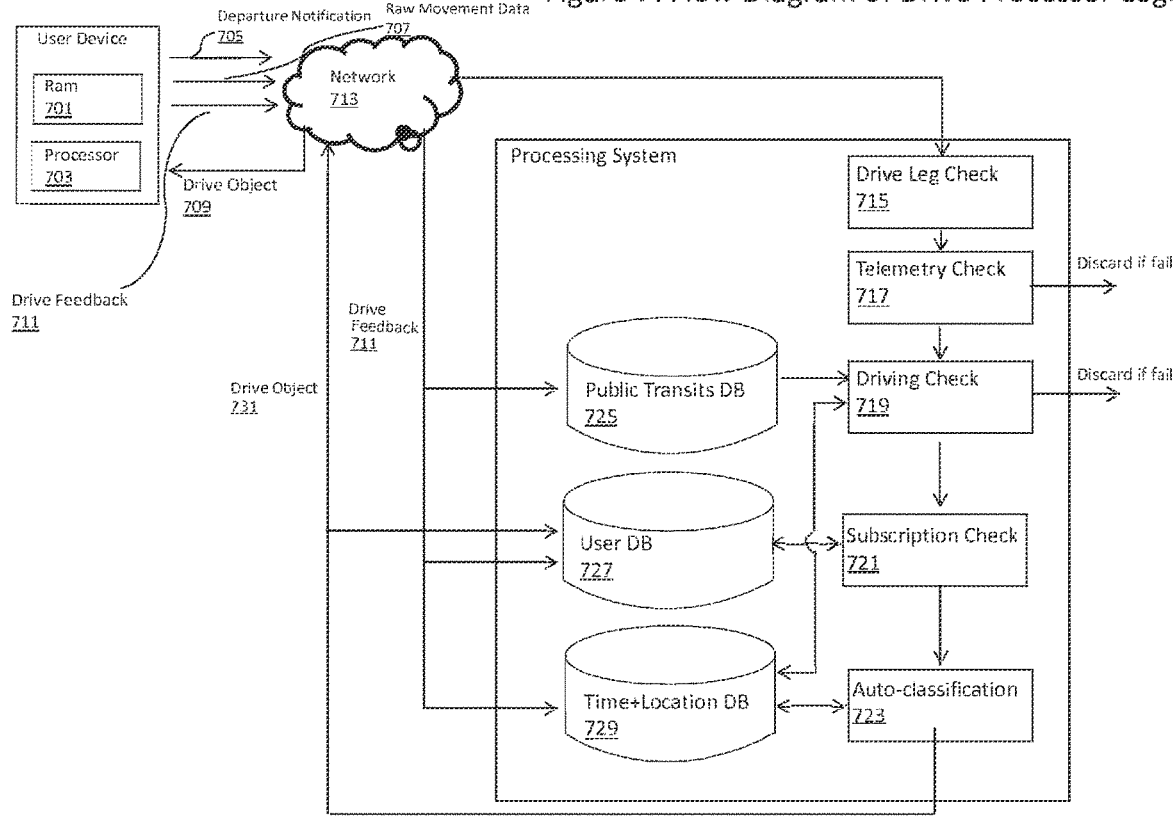

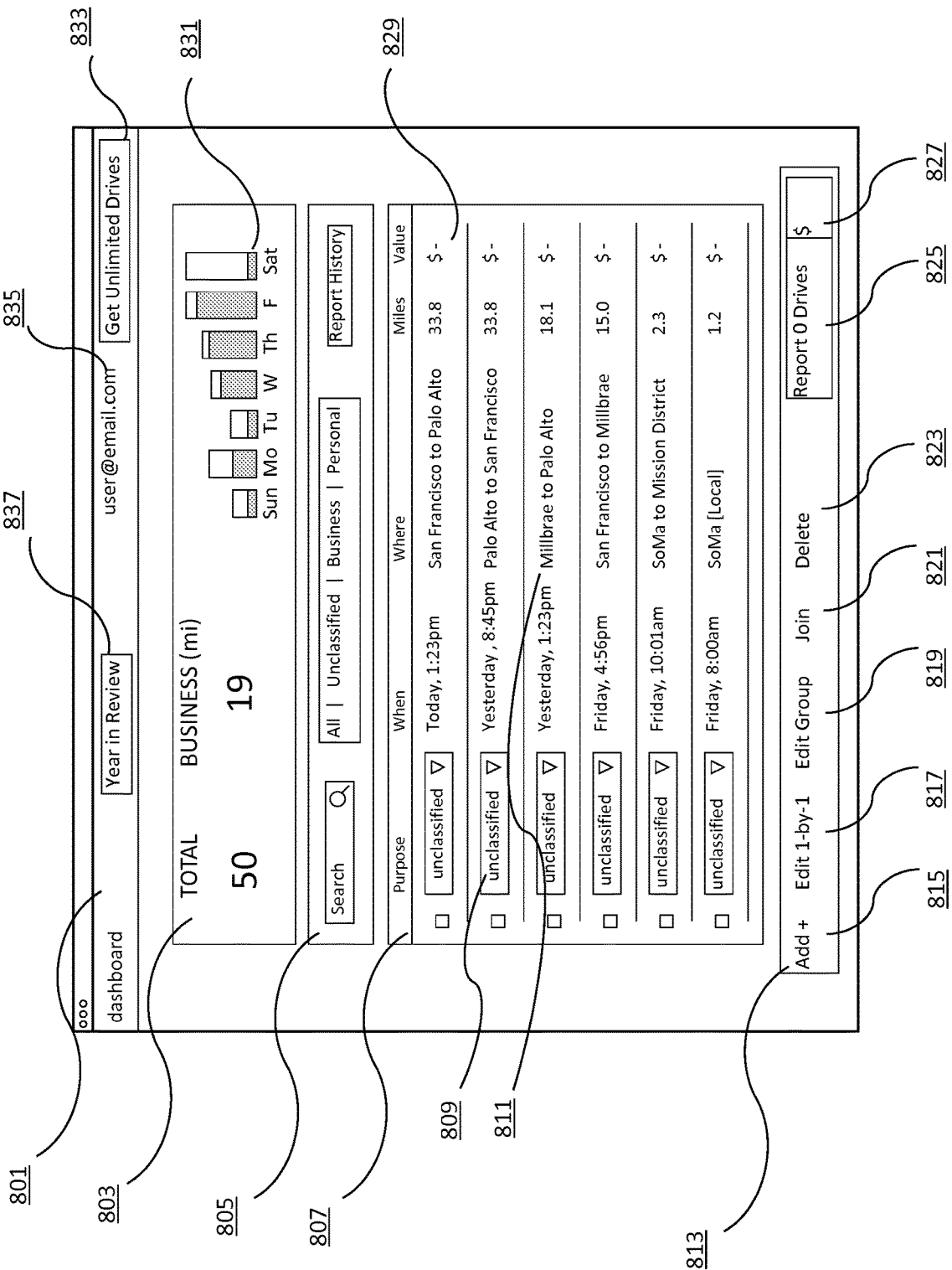
Figure 8A: Flow Diagram of Web Navigation

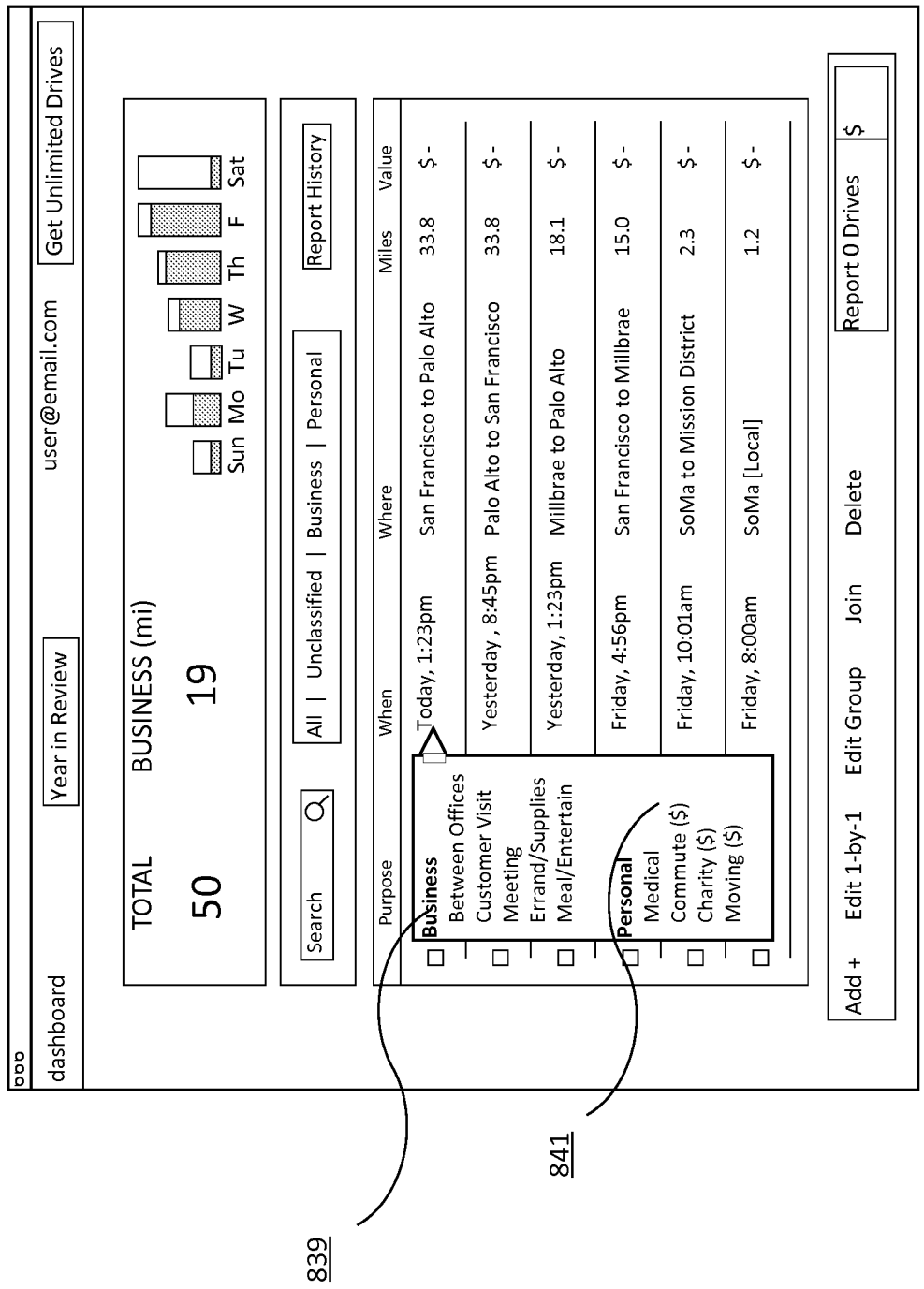
Figure 8B: Flow Diagram of Web Navigation

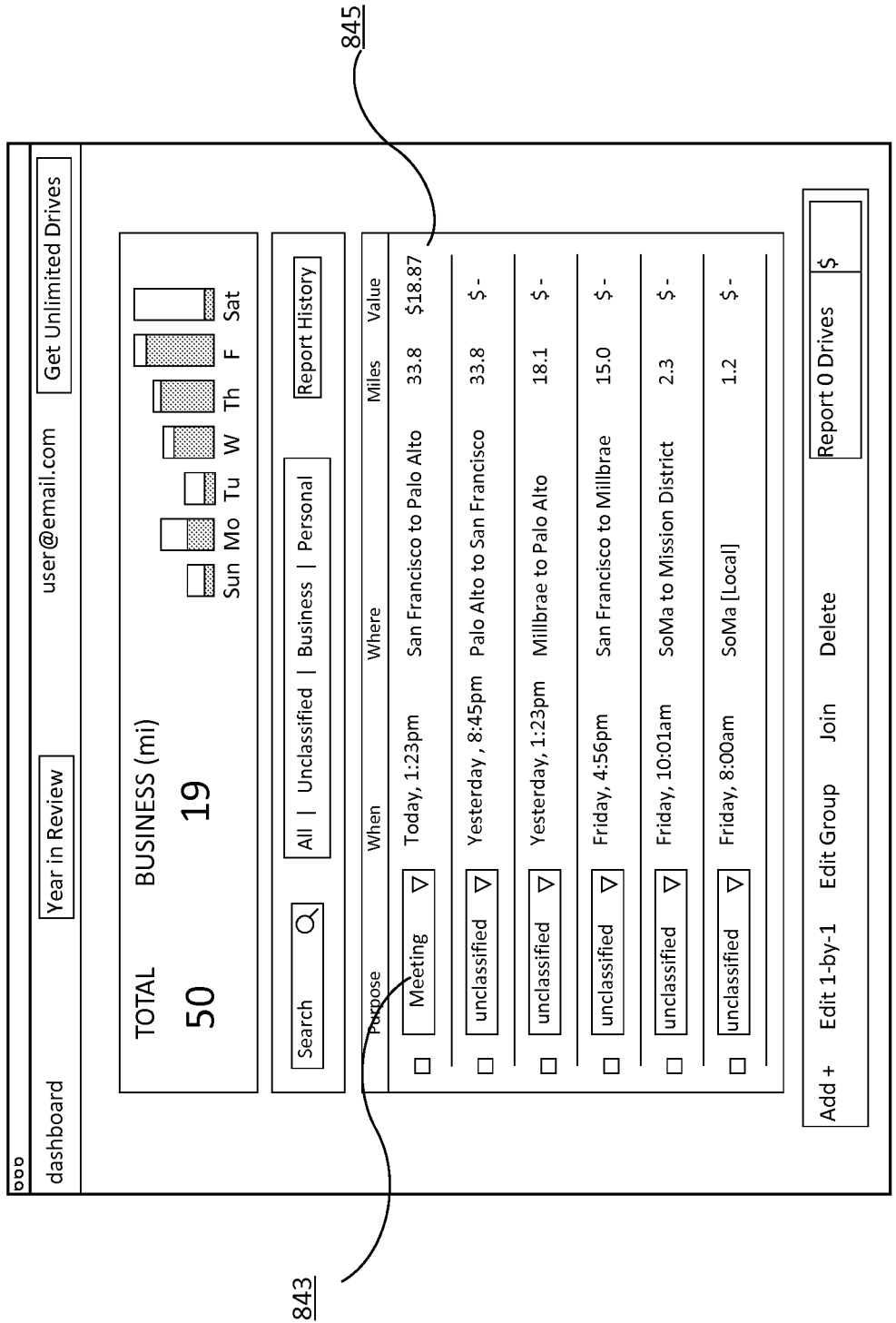
Figure 8C: Flow Diagram of Web Navigation

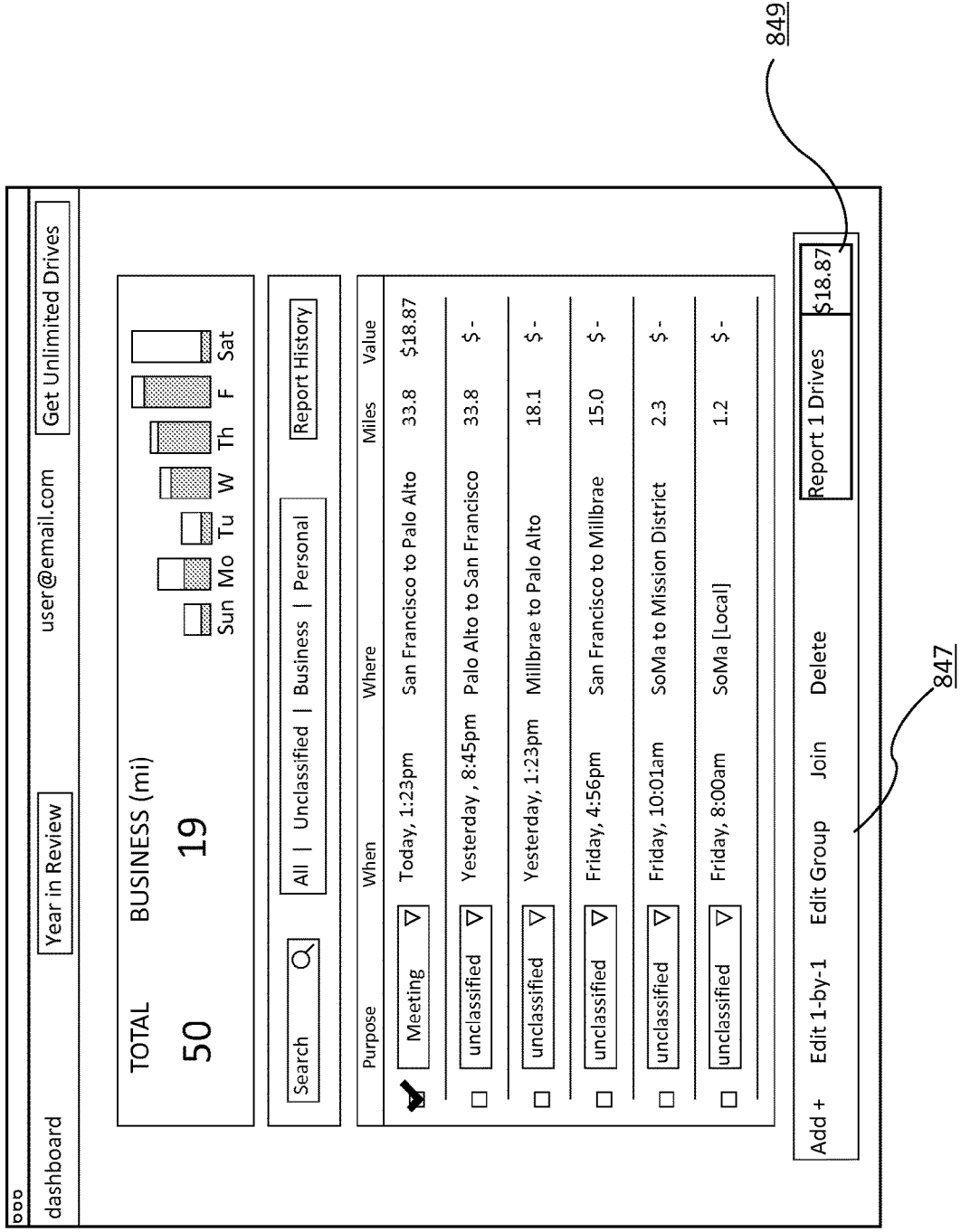
Figure 8D: Flow Diagram of Web Navigation

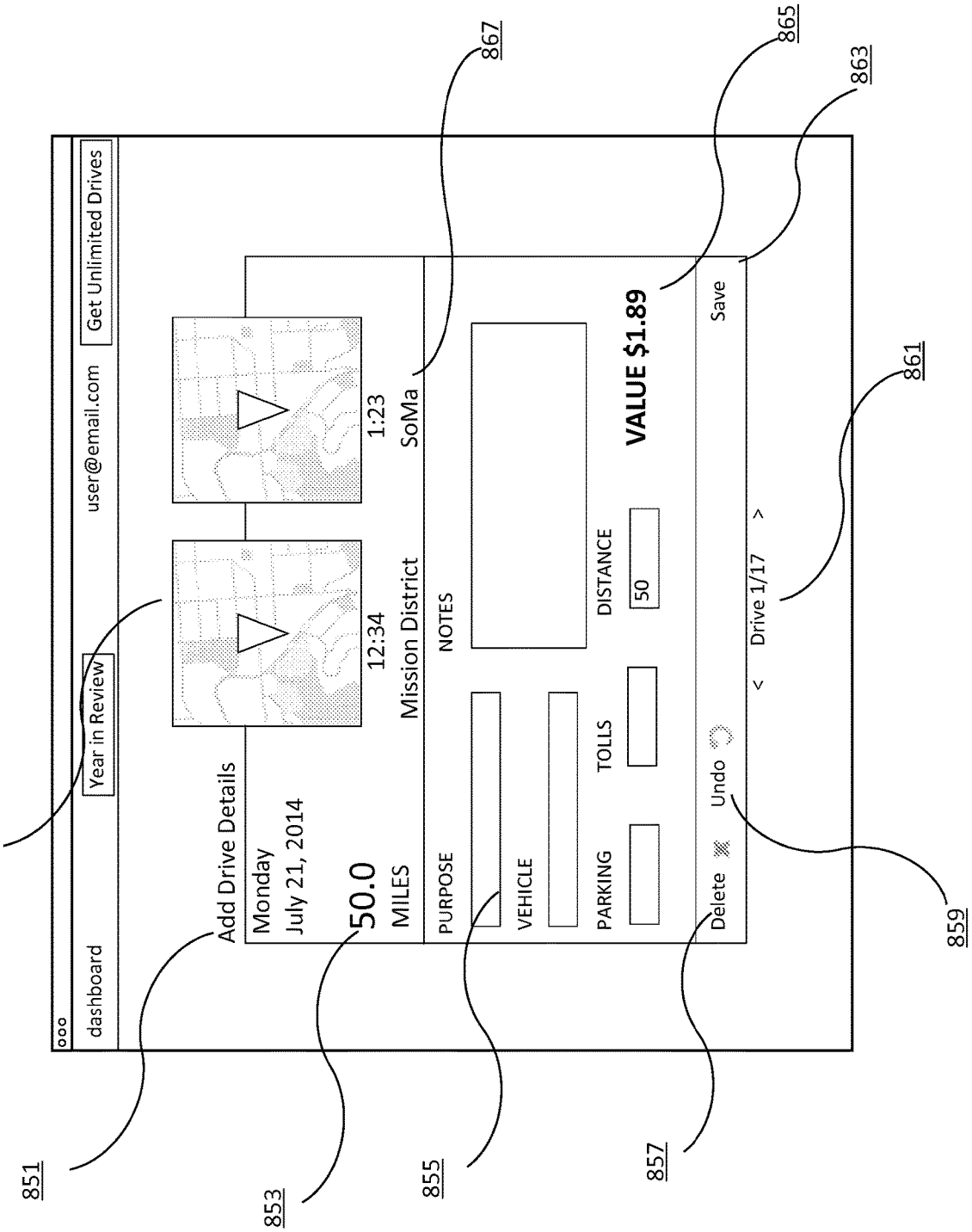
Figure 8E: Flow Diagram of Web Navigation

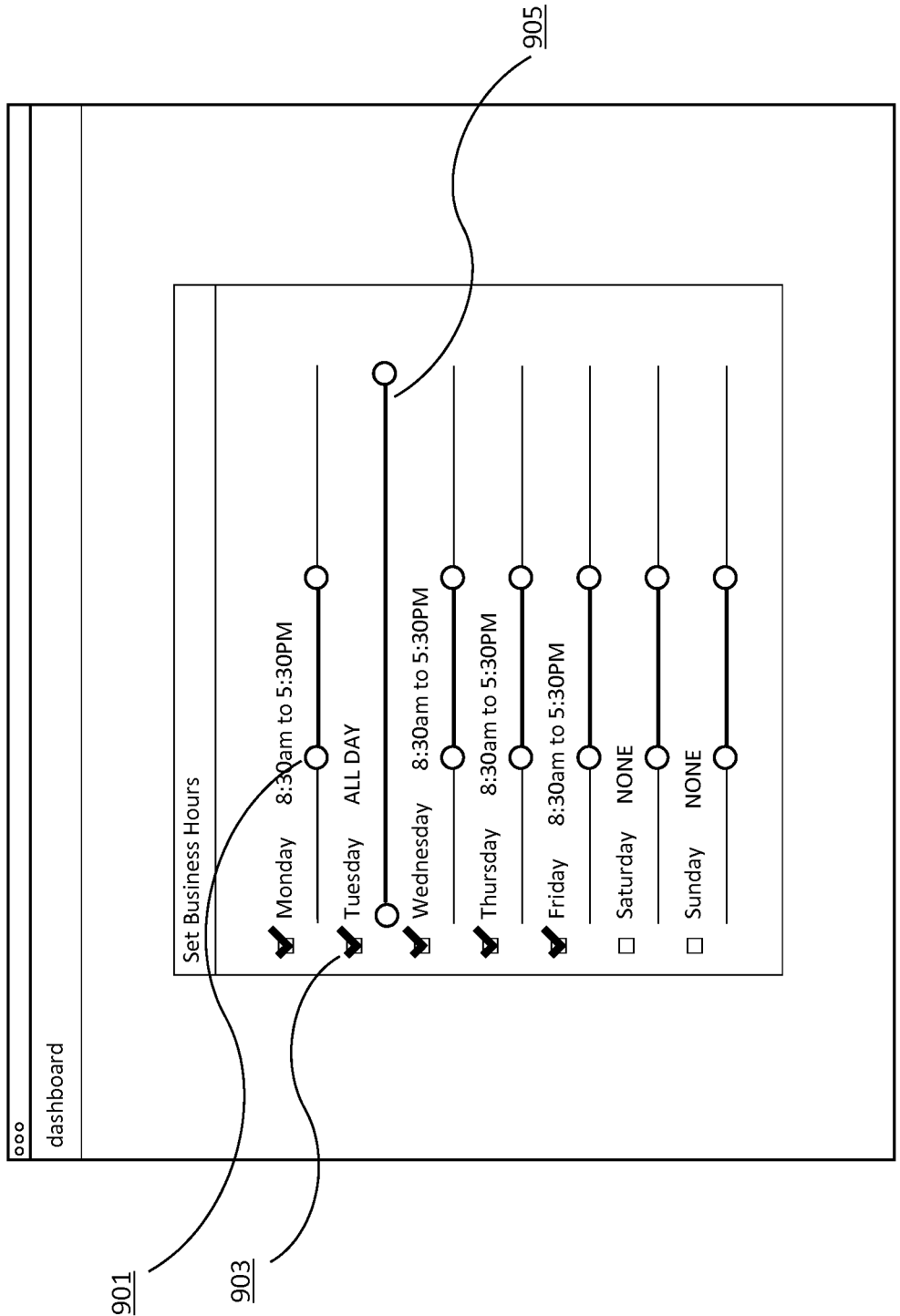
Figure 9: Flow Diagram of Classification Rules

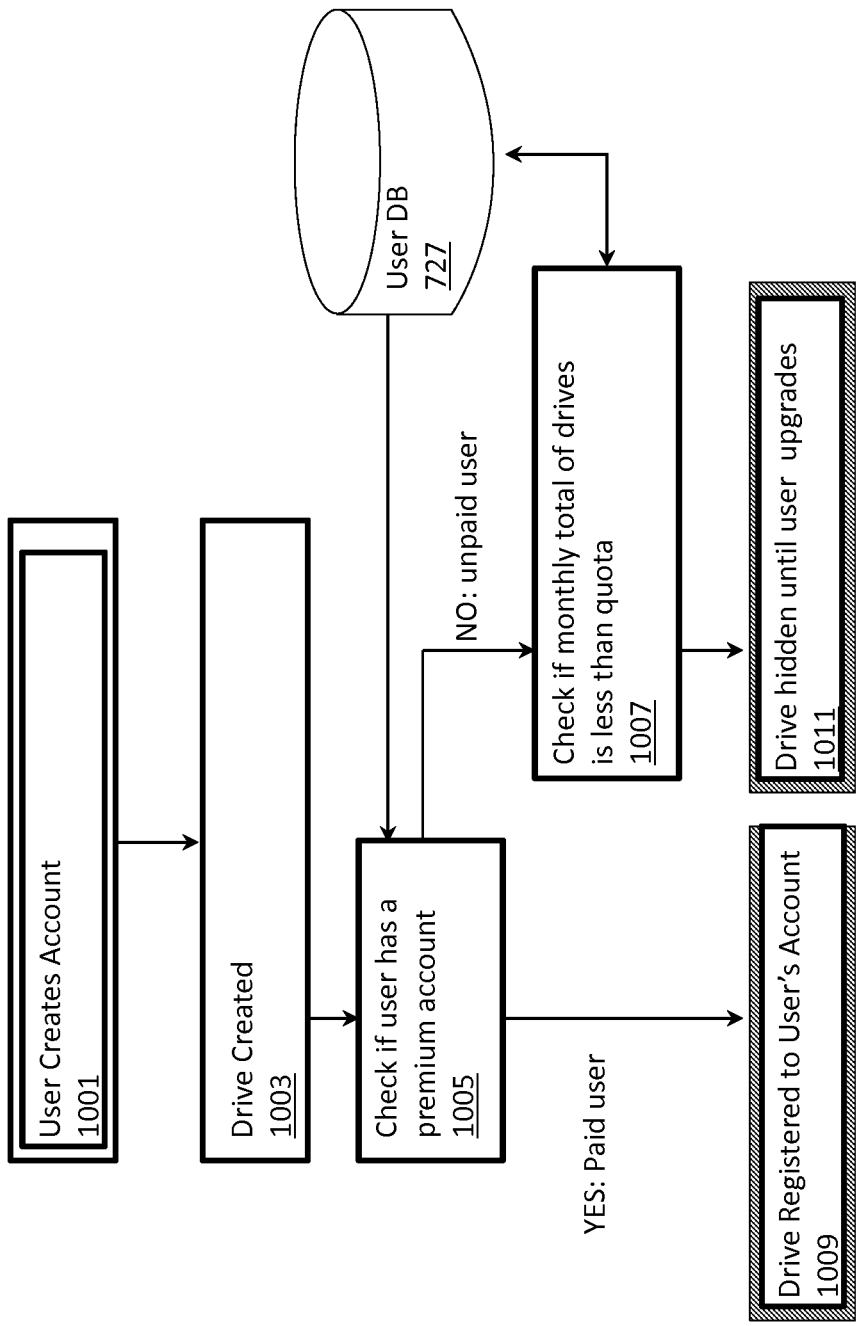

MOBILE DEVICE DISTANCE TRACKING

CROSS-REFERENCE TO RELATED APPLICATIONS

This application is a continuation of, and claims priority to, U.S. patent application Ser. No. 15/628,395, filed Jun. 20, 2017, which in turn is a continuation of, and claims priority to, U.S. patent application Ser. No. 14/449,965, filed Aug. 1, 2014, the entire contents of both are hereby incorporated by reference herein.

BACKGROUND OF INVENTION

The present invention relates generally to mobile techniques. More particularly, the present invention provides a method and system for tracking a location of an entity using a mobile device for purposes of collecting distance data. Merely by way of example, the present invention can be applied to a mobile device, a tablet computer, or other communication devices.

Most business expenses can be tracked with receipts and credit card statements. Mileage, however, cannot be tracked efficiently. The requirements for tax purposes (and similarly for employer reimbursement) are that a vehicle owner (including lessee) track the following information for every drive: starting location, ending location, distance traveled, time of drive, date of drive, purpose of drive.

Most drivers often do not bother to log their miles as it is too painful a process, but those who do tend to rely on either: (a) a paper log where you capture your odometer readings, time, date, and purpose or (b) a digital log where you either capture that same information or you use a global positioning sensor, commonly termed "GPS" function to start tracking your drive when you start and stop tracking your drive when you stop. What all of these have in common is that a user still needs to actively log their miles at the start and end of a drive.

There are devices that can be installed in a car that use GPS data to track every drive in the background, but they are expensive to install and require technical expertise and certainly are impractical for someone that uses multiple vehicles for their business purposes. Further details of limitations with conventional techniques can be found throughout the present specification and more particularly below.

From the above, there is a need for techniques to track mileage using an improved technique.

SUMMARY OF THE INVENTION

According to the present invention, techniques related generally to mobile are included. More particularly, the present invention provides a method and system for tracking a location of an entity using a mobile device for purposes of collecting distance data. Merely by way of example, the present invention can be applied to a mobile device, a tablet computer, or other communication devices.

As further information, we discovered that there is a desire for a mileage tracking system that can capture all the required drive information in the background, without the need for additional dedicated hardware, and that can allow the user to complete their mileage logs on their own schedule and from any device of their choosing while still meeting the standards of timeliness and accuracy. There is a further need to simplify the process of classifying and submitting drives for reimbursement/tax credit. There is also a need to learn from a user's past drive classifications and other contextual information (like their calendar and their other activities) and predict accurately the purpose and related expenses for any given drive.

In an example, the present invention provides techniques that provide an expense tracking service. The techniques include, among other features, (1) a smartphone application that leverages the computing and location powers of the mobile phone or tablet to capture user drives automatically and present them in an easy-to-modify and easy-to-classify interface (2) a browser interface that presents the same drive information but with additional functionality and (3) one or more systems and databases in the cloud that can process drive information, algorithmically classify drive information, and enable the user to submit their drive information via printout, email, spreadsheet, or integration with tax, accounting, expensing and invoicing tools. The present techniques provide an intuitive interface, a simple mechanism for classifying drives, cloud storage, and reporting for tax, expense, invoicing and accounting needs. These and other features are described throughout the present specification and more particularly below.

In an example, the present invention provides a method for capturing vehicle mileage information. The method includes providing a mobile wireless device. The method includes initiating an application program configured on the mobile wireless device without requiring any user input using any input device. That is, in an example, the user merely keeps the mobile device such as a cell phone in the car or his/her pocket, and the application initiates itself, based upon sensor devices. No particular key, voice, or other input is required in an example. The method includes initiating the application upon movement of the mobile wireless device. The method includes using a mapping module to track a start point of a route for the mobile wireless device. The method includes moving the mobile wireless device from the start point through one or more legs. The method includes using algorithms, calculations, and/or data (e.g., traffic) to identify one or more of the legs as a route or drive. The method includes identifying a stop point using the mapping module from the start point through the one or more legs. The method includes outputting, on a display of the mobile wireless device, or on another connected device (at present or in the future), a graphical representation of a route beginning from the start point to the stop point; and concurrently outputting a number representative of a distance between the start point and the stop point. The method includes classifying the drive via a user input or computer algorithm to indicate the purpose of the drive for tax or reimbursement purposes.

A further understanding of the nature and advantages of the invention may be realized by reference to the latter portions of the specification and attached drawings.

BRIEF DESCRIPTION OF THE DRAWINGS

In order to more fully understand the present invention, reference is made to the accompanying drawings. Understanding that these drawings are not to be considered limitations in the scope of the invention, the presently described embodiments and the presently understood best mode of the invention are described with additional detail through use of the accompanying drawings in which:

FIGS. 4A, 4B, and 4C illustrate a simplified flow diagram of mobile app navigation using user interfaces in an example according to the present invention.

FIG. 5 is a simplified flow diagram of the process by which the user's drive classification request propagates through the system in an example according to present invention.

FIG. 6 is a simplified flow diagram the process by which the client hardware chronically monitors user activity in order to send the data to downstream processing on a remote computer in an example.

FIG. 7 is a simplified flow diagram of the processing of raw movement data taken from client device into drive objects in an example.

FIGS. 8A, 8B, 8C, 8D, and 8E illustrate simplified flow diagrams of the interface for web browser-based interactions, walking through critical activities of drive management, drive editing, and expense reporting in an example.

FIG. 9 is the simplified diagram to show an example of how a user might set time periods for which the drives he makes are to be immediately classified as business or personal drives or for other future classification.

FIG. 10 is a simplified flow diagram of the user account types as it corresponds to drive addition to a specific user account in an example.

DETAILED DESCRIPTION OF THE EXAMPLES

Figure 1:
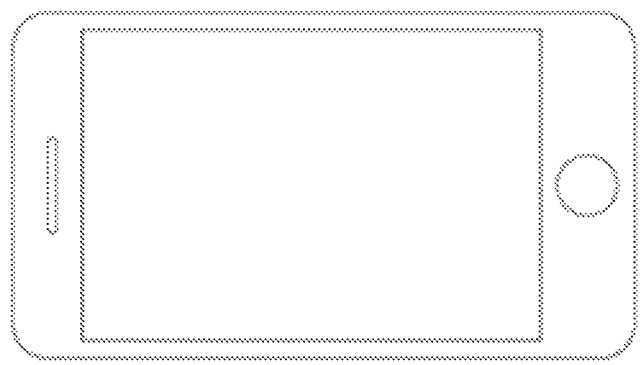
FIG. 1 is a simplified illustrating a smart phone according to an example of the present invention.

According to the present invention, techniques related generally to mobile are included. More particularly, the present invention provides a method and system for tracking a location of an entity using a mobile device for purposes of collecting distance data. Merely by way of example, the present invention can be applied to a mobile device, a tablet computer, or other communication devices.

In an example, the present invention provides one or more of the following features:

In an example, the technique automatically creates logs of distinct drives using mobile phone telemetry data. Our system runs in the background—independent of user input after proper approval—and monitors user's accelerometer, gyroscope, magnetometer and GPS data. Through inferred parameters and algorithms, we detect and capture their drives and store them into a database for further presentation and classification. The system is always on but the user never needs to tell it a drive has occurred.

In an alternative example, the technique is characterized by an ability to determine if a user arrival is the end of a drive or a stop along their way—when there is a stop but a drive is not complete, our techniques combine the legs into one drive.

In other examples, the techniques accurately detect a car drive, differentiated from other movements (walks, flights, etc.) extracted from a multitude of signals to feed into determining the start and end of a drive, including but not limited to the mobile phone's telemetry data, car engine noise, sound of a door closing, Bluetooth pairing, ODB sensors, etc., among other aspects.

In an example, techniques include automatic inference of driver's purpose. Each drive for a professional purpose (and those for personal purposes) has to be marked as such—this can be done from prior knowledge of a driver's behavior. Our intelligent system will perform a multi-class classification. Some examples of the algorithm include the ability to: auto-classify drives based on calendar events; auto-classify drives based on credit card expenses; auto-classify drives based on named locations or past classifications of similar drives; auto-classify drives based on tax rules (ex. home to office is a commute); auto-populate vehicle information based on Bluetooth pairing or other vehicle communications; auto-populate toll fees based on credit card or electronic toll pass; auto-populate parking fees based on credit card or electronic parking pass.

In an example, the techniques include a method to offer predictions of how a drives should be classified that the user can either corroborate or correct. The present system will learn from each classification a user makes and learn over time how to automatically classify more and more of their drives. The present system can indicate those auto-classifed drives to the user so as to distinguish them.

In other examples, the technique includes app interfaces: the simplified digital logbook. For a driver, a worksheet to track all information necessary to expense the drives can become very complicated. Our techniques include a highly simplified method of presenting the minimal amount of information in the largest and clearest way possible, with a clear mechanism for the user to access. Some examples of this technique include: the card which represents an abstraction of a row of a spreadsheet; the start/end maps or a simplified route map; the distance on the card; the drive value calculation; the flip-able call-to-action with substantial details on the back side. Another novel feature for creating a detailed drive log simply is the presentation of drive "cards" that can be swiped left or right to classify, which means that with one simple step the user can create a timely and accurate log of the time, the place, the distance, and whether a drive was business or personal. In this example, the user can later add additional drive purpose details (e.g., Client meeting), but other embodiments enable the user to add additional drive purpose details in the initial classification. The present embodiment provides a default set of drive purposes and alternate embodiments provide an option for the user to select from a pre-determined list (e.g., Real estate agent purposes) and/or create a custom list of drive purposes.

In other examples, the techniques include additional user utility. The ability to modify drives by joining two or more together, edit multiple drives at once, customize drive purposes, set business hours, store vehicle information, name locations.

In an example, techniques also include visual representation of the value of miles—for any drive, our system shows its potential value in the drive card and once classified, shows a real-time update of the user's monthly tally of drives.

In a further example, techniques include cloud-based mileage logs—unlike other products that store the drive information locally on the phone and create a backup in the cloud, our system takes raw drive data inputs (that can come from the phone, the car, or other data sources) then processes them into drives and makes them available simultaneously across native mobile apps as well as a web interface. This enables us to synchronize in real-time across platforms and also to take inputs from varied sources (such as car computers, dongles, etc and turn those into drives).

Techniques also include capturing drive data in real-time but allowing the user to classify the drive in a time-shifted manner. Most tax bodies require a log to be timely and accurate. Our system ensures that the time, date, start location, end location, and distance are all timely and accurate, but allow the user to classify the drive's purpose at a later time.

Further, techniques include an integrated mileage submission. Our system enables the user to synchronize mileage reports with accounting, expensing, invoicing, and tax software without requiring any data re-entry. This removes a time burden and also decreases the likelihood of erroneous submissions for reimbursement or tax credits.

In other example, techniques include automated mileage summary for tax purposes. At any time, a user can get an up to date summary of all of their drives, broken out by vehicle and year, with miles allocated to business, personal, and commute as well as all relevant parking and toll expenses. This requires no additional work by the user and can also be synced directly with tax software to eliminate any manual data entry.

In yet other examples, techniques include a swipe to classify for credit card and other expenses, not just miles. Our method for displaying and classifying drives works for other expenses that need to be categorized and submitted for tax or reimbursement purposes. In an example, the method uses a system for showing user expenses in a card format that can be swiped left or right based on desired classification.

In further examples, techniques include custom swipe options. Allowing the user to choose what they want to swipe expenses as (ex. Personal—Business or Charity—Business or User defined Job #1—User defined Job #2). By letting users customize their broad categorization, we provide added utility.

Other examples include an ability to associate additional multimedia attachments to an expense in the form of photos, videos, voice and text to create a single unit to hold the multiple facets of that expense (e.g. attaching the photo of a receipt for parking and the toll amount attached to that drive or adding a voice memo while driving that is attached or transcribed to that drive record).

In further examples, techniques include automatic presentation of drives as calendar events. Our system can present each drive a user takes in their calendar to make them easier to classify with business purpose.

In other examples, techniques include pre-set purposes and rates that comply with local tax authority regulations to ensure that a user who isn't a tax professional can easily create a compliant mileage log.

Techniques also include on-demand (user-triggered), weekly and monthly scheduled user notifications of their drives taken, miles driven, drives classified and those still left to classify.

Optionally, techniques include embodiments for creating an account based on your VIN number or license plate—a unique identifier for your vehicle that becomes your unique ID.

Further, techniques for deleting drives as a means of improving drive processing algorithms by having the user select reason for deleting (ex. public transit, passenger in another car) are included.

In other examples, techniques include an ability to make overall and real time recommendations based on drive patterns. This could be better times to commute to avoid traffic, convenient locations to stop on a journey, warnings that a user is missing drives, etc.

FIG. 1 is a simplified diagram illustrating a smart phone with a capture image of a user according to an embodiment of the present invention. As shown, the smart phone includes a housing, display, and interface device, which may include a button, microphone, or touch screen. Preferably, the phone has a high-resolution camera device, which can be used in various modes. An example of a smart phone can be an iPhone from Apple Computer of Cupertino California. Alternatively, the smart phone can be a Galaxy from Samsung or others.

In an example, the smart phone includes the following features (which are found in an iPhone 4 from Apple Computer, although there can be variations), See www.apple.com.

"GSM model: UMTS/HSDPA/HSUPA (850, 900, 1900, 2100 MHz); GSM/EDGE (850, 900, 1800, 1900 MHz)
CDMA model: CDMA EV-DO Rev. A (800, 1900 MHz)
802.11b/g/n Wi-Fi (802.1 in 2.4 GHz only)
Bluetooth 2.1+EDR wireless technology
Assisted GPS
Digital compass
Wi-Fi
Cellular
Retina display
3.5-inch (diagonal) widescreen Multi-Touch display
800:1 contrast ratio (typical)
500 cd/m2 max brightness (typical)
Fingerprint-resistant oleophobic coating on front and back
Support for display of multiple languages and characters simultaneously
5-megapixel iSight camera
Video recording, HD (720p) up to 30 frames per second with audio
VGA-quality photos and video at up to 30 frames per second with the front camera
Tap to focus video or still images
LED flash
Photo and video geotagging
Built-in rechargeable lithium-ion battery
Charging via USB to computer system or power adapter
Talk time: Up to 7 hours on 3G, up to 14 hours on 2G (GSM)
Standby time: Up to 300 hours
Internet use: Up to 6 hours on 3G, up to 10 hours on Wi-Fi
Video playback: Up to 10 hours
Audio playback: Up to 40 hours
Frequency response: 20 Hz to 20,000 Hz
Audio formats supported: AAC (8 to 320 Kbps), Protected AAC (from iTunes Store), HE-AAC,
MP3 (8 to 320 Kbps), MP3 VBR, Audible (formats 2, 3, 4, Audible Enhanced Audio, AAX, and AAX+), Apple Lossless, AIFF, and WAV
User-configurable maximum volume limit
Video out support at up to 720p with Apple Digital AV Adapter or Apple VGA Adapter; 576p and 480p with Apple Component AV Cable; 576i and 480i with Apple Composite AV Cable (cables sold separately)
Video formats supported: H.264 video up to 720p, 30 frames per second, Main Profile Level 3.1 with AAC-LC audio up to 160 Kbps, 48 kHz, stereo audio in .m4v, .mp4, and .mov file formats; MPEG-4 video up to 2.5 Mbps, 640 by 480 pixels, 30 frames per second, Simple Profile with AAC-LC audio up to 160 Kbps per channel, 48 kHz, stereo audio in .m4v, .mp4, and .mov file
formats; Motion JPEG (M-JPEG) up to 35 Mbps, 1280 by 720 pixels, 30 frames per second, audio in ulaw, PCM stereo audio in .avi file format
Three-axis gyro
Accelerometer
Proximity sensor
Ambient light sensor."

An exemplary electronic device may be a portable electronic device, such as a media player, a cellular phone, a personal data organizer, or the like. Indeed, in such embodiments, a portable electronic device may include a combination of the functionalities of such devices. In addition, the electronic device may allow a user to connect to and communicate through the Internet or through other networks, such as local or wide area networks. For example, the portable electronic device may allow a user to access the internet and to communicate using e-mail, text messaging, instant messaging, or using other forms of electronic communication. By way of example, the electronic device may be a model of an iPod having a display screen or an iPhone available from Apple Inc.

In certain embodiments, the device may be powered by one or more rechargeable and/or replaceable batteries. Such embodiments may be highly portable, allowing a user to carry the electronic device while traveling, working, exercising, and so forth. In this manner, and depending on the functionalities provided by the electronic device, a user may listen to music, play games or video, record video or take pictures, place and receive telephone calls, communicate with others, control other devices (e.g., via remote control and/or Bluetooth functionality), and so forth while moving freely with the device. In addition, device may be sized such that it fits relatively easily into a pocket or a hand of the user. While certain embodiments of the present invention are described with respect to a portable electronic device, it should be noted that the presently disclosed techniques may be applicable to a wide array of other, less portable, electronic devices and systems that are configured to render graphical data, such as a desktop computer.

In the presently illustrated embodiment, the exemplary device includes an enclosure or housing, a display, user input structures, and input/output connectors. The enclosure may be formed from plastic, metal, composite materials, or other suitable materials, or any combination thereof. The enclosure may protect the interior components of the electronic device from physical damage, and may also shield the interior components from electromagnetic interference (EMI).

The display may be a liquid crystal display (LCD), a light emitting diode (LED) based display, an organic light emitting diode (OLED) based display, or some other suitable display. In accordance with certain embodiments of the present invention, the display may display a user interface and various other images, such as logos, avatars, photos, album art, and the like. Additionally, in an embodiment, the display may include a touch screen through which a user may interact with the user interface. The display may also include various function and/or system indicators to provide feedback to a user, such as power status, call status, memory status, or the like. These indicators may be incorporated into the user interface displayed on the display.

In an embodiment, one or more of the user input structures are configured to control the device, such as by controlling a mode of operation, an output level, an output type, among others. For instance, the user input structures may include a button to turn the device on or off. Further the user input structures may allow a user to interact with the user interface on the display. Embodiments of the portable electronic device may include any number of user input structures, including buttons, switches, a control pad, a scroll wheel, or any other suitable input structures. The user input structures may work with the user interface displayed on the device to control functions of the device and/or any interfaces or devices connected to or used by the device. For example, the user input structures may allow a user to navigate a displayed user interface or to return such a displayed user interface to a default or home screen.

The exemplary device may also include various input and output ports to allow connection of additional devices. For example, a port may be a headphone jack that provides for the connection of headphones. Additionally, a port may have both input/output capabilities to provide for connection of a headset (e.g., a headphone and microphone combination). Embodiments of the present invention may include any number of input and/or output ports, such as headphone and headset jacks, universal serial bus (USB) ports, IEEE-1394 ports, and AC and/or DC power connectors. Further, the device may use the input and output ports to connect to and send or receive data with any other device, such as other portable electronic devices, personal computers, printers, or the like. For example, in an embodiment, the device may connect to a personal computer via an IEEE-1394 connection to send and receive data files, such as media files. Further details of the device can be found in U.S. Pat. No. 8,294,730, assigned to Apple, Inc.

Figure 2:
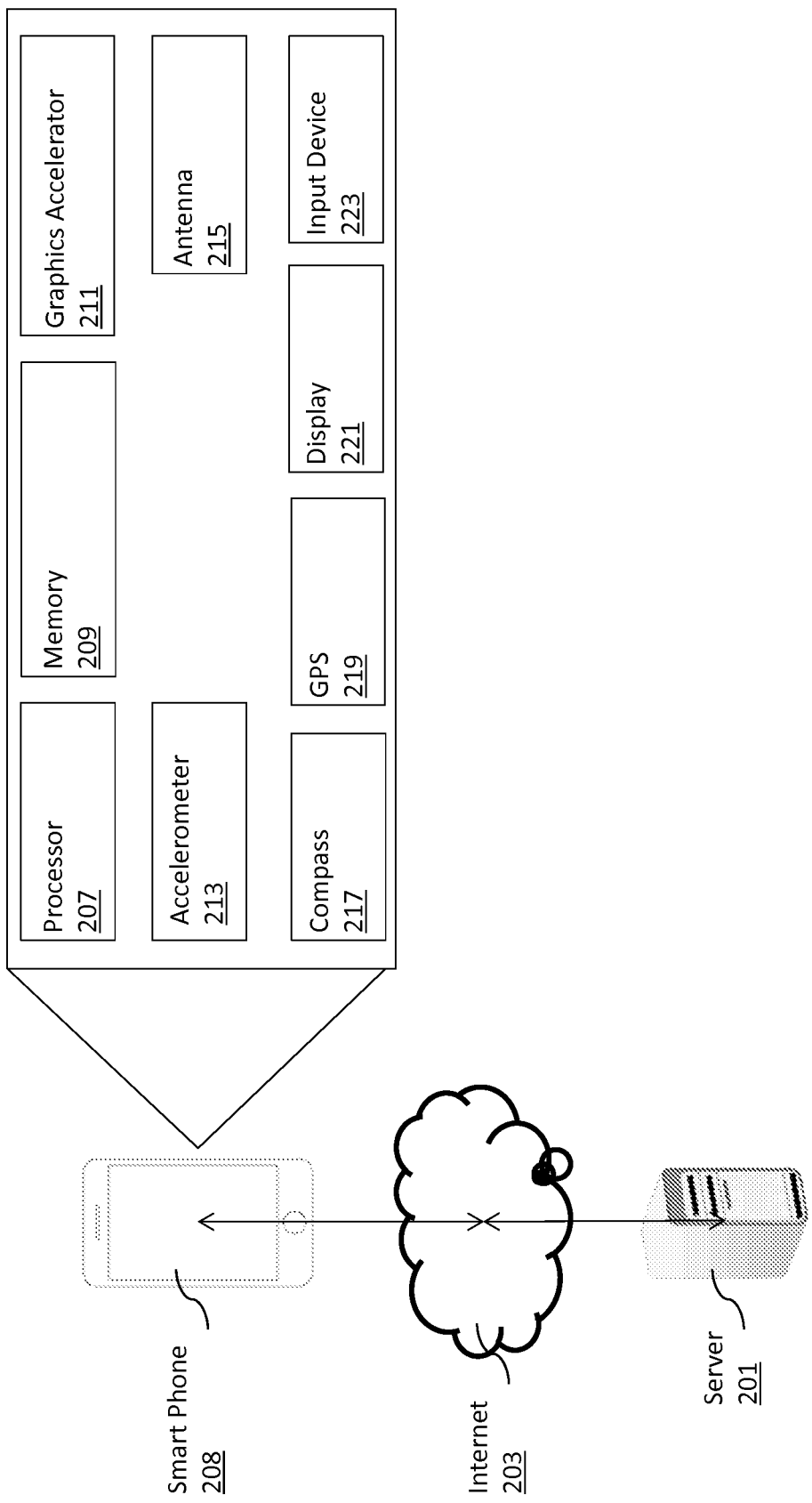
FIG. 2 is a simplified system diagram with a smart phone according to an example of the present invention.

FIG. 2 is a simplified system diagram with a smart phone according to an embodiment of the present invention. A server 201 is in electronic communication with a handheld electronic device 208 having functional components such as a processor 207, memory 209, graphics accelerator 211, accelerometer 213, antenna 215, communications interface, compass 217, GPS 219, display 221, and input device 223. Each device is not limited to the illustrated components. The components may be hardware, software or a combination of both. Handheld device is coupled to server via the network 203.

In some examples, instructions are input to the handheld electronic device 208 through an input device that instructs the processor 207 to execute functions in an electronic imaging application. One potential instruction can be to generate a map and route, as further provided below.

Figure 3:
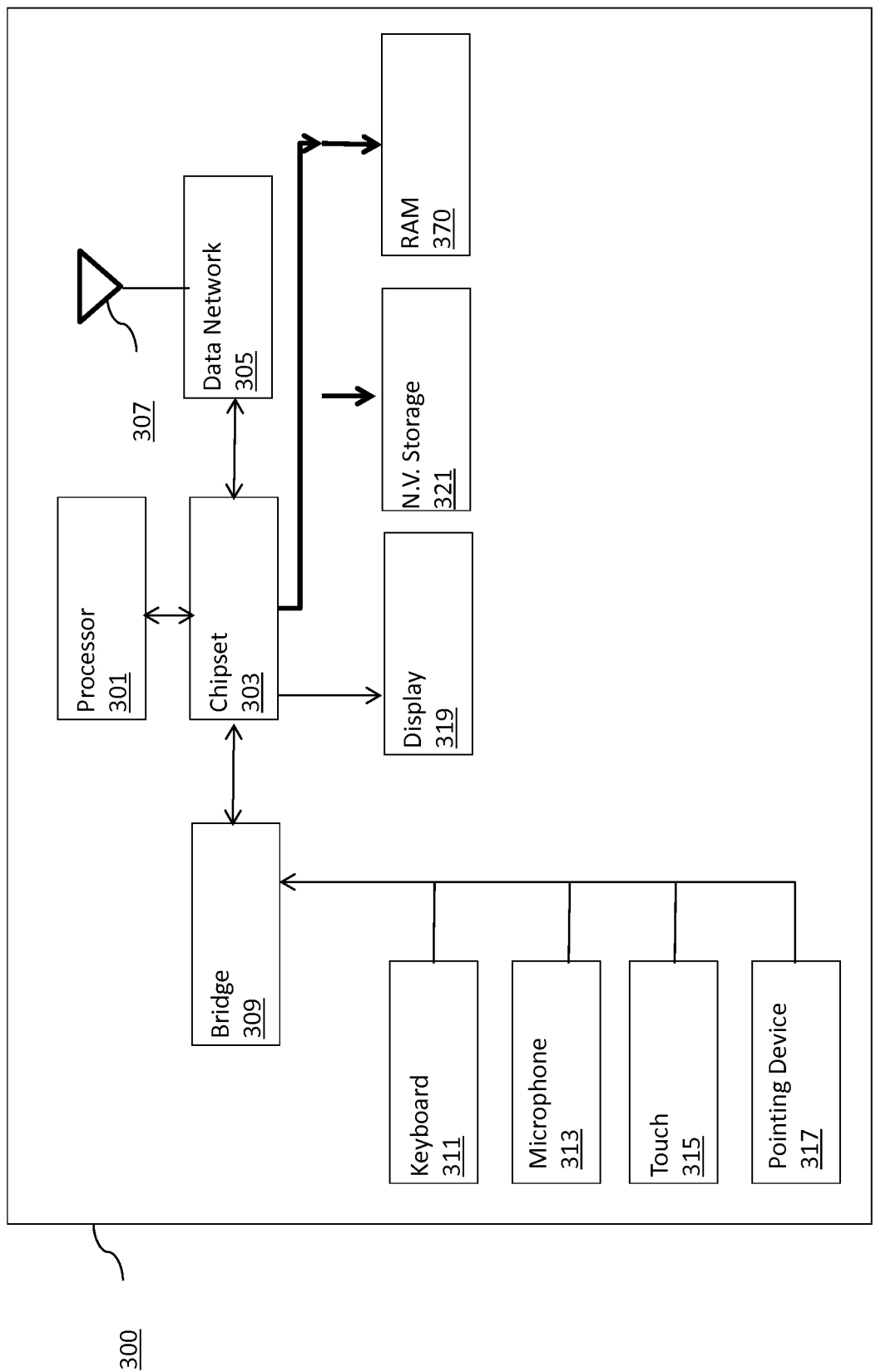
FIG. 3 is a simplified diagram of a smart phone system diagram according to an example of the present invention.

FIG. 3 is a simplified diagram of a smart phone system diagram according to an example of the present invention. System 300 is an example of hardware, software, and firmware that can be used to implement disclosures above. System 300 includes a processor 301, which is representative of any number of physically and/or logically distinct resources capable of executing software, firmware, and hardware configured to perform identified computations. Processor 301 communicates with a chipset 303 that can control input to and output from processor. In this example, chipset outputs information to display 319 and can read and write information to non-volatile storage 321, which can include magnetic media and solid-state media, for example. Chipset 303 also can read data from and write data to RAM 370. A bridge 309 for interfacing with a variety of user interface components can be provided for interfacing with chipset. Such user interface components can include a keyboard 311, a microphone 313, touch-detection-and-processing circuitry 315, a pointing device such as a mouse 317, and so on. In general, inputs to system 300 can come from any of a variety of sources, machine-generated and/or human-generated sources.

Chipset 322 also can interface with one or more data network interfaces 325 that can have different physical interfaces. Such data network interfaces can include interfaces for wired and wireless local area networks, for broadband wireless networks, as well as personal area networks. Some applications of the methods for generating and displaying and using the GUI disclosed herein can include receiving data over physical interface or be generated by the machine itself by processor analyzing data stored in memory 321 or 370. Further, the machine can receive inputs from a user via devices keyboard 311, microphone 313, touch device 315, and pointing device 317 and execute appropriate functions, such as browsing functions by interpreting these inputs using processor 301. As further show is data network 205 and antenna 307.

FIGS. 4A, 4B, 4C, and 4C illustrate a simplified flow diagram of mobile app navigation using user interfaces in an example according to the present invention. In an example, as shown, the user interface for the mobile device system is split between multiple user experiences. In an example, the user interface and resulting methods make the user experience configured with certain hardware features to optimize the user experience, while taking into account any limitations of the hardware.

In an example, the drives screen is one of the core interactions of the mobile app, and is intentionally configured with a reduced feature set of the primary interface (FIG. 8A-8E), comprising a card-based (27) layout and a three-element dashboard in the top (26), among other features. The reduced feature set allows for an easy to use navigation characteristic in an example.

Referring back to the Figure, as shown, two primary screens (or displays) are configured for the mobile experience. FIG. 4A shows one possible embodiment of the drive card system in the primary screen, FIG. 4B shows, as an example, how a user might use a simple gesture to classify their drives as for either "business" or "personal," and FIG. 4C shows, as one example, the menu experience for which the user may navigate the rest of the app, notably to the Account (425) and Drives (429) screen, and maintain connection with the user's payment status with the product (433). Further details of each of these screens are provided throughout the present specification and more particularly below.

In an example, the drives screen has a display configured as a card. Each card has a route including a starting location and an ending location in both graphical mapping features and text wording, including a city or city location. A start time and a stop time is also displayed. As shown, the card also shows whether the card is "UNCLASSIFIED" or "CLASSIFIED." Moreover, the card also has a representation of a distance, monetary value associated with the distance, and time. Of course, there can be other variations, modifications, and alternatives. The card may be referenced to a physical paper card, which allows the user to "flip" between the two sides (FIG. 4C). Further details of the drives screen are provided throughout the present specification and more particularly below. In an alternate embodiment, the drive may be represented as a route from start point to end point and further may provide the user the option to adjust the start and end points or the route taken. In an example, an alternative is a route line.

In an example, shown in FIG. 4A, every drive caught by the present techniques represented by the single card that has both a "front" (405) and a "back," (449). In an example, the user can toggle between using the "details" button (413). As shown, the front is designed to show the most important information of the drive: containing two maps for the start and stop location (409), time and name of the start and stop cities (411), the date (407), the possible value of a drive should it be designated as business (421) and a label for the classification of the drive (419). The cards may be shown as a continuous vertical scroll. This view, further referred to as the Drives view may be accessed at any time by the user by invoking the side-bar menu option (423).

As the system will only track a fixed number of drives per month for a non-paying user, the system will clearly communicate the user's status with regards to their monthly quota (433). The user can press the adjacent button (435) to initiate the subscription process to become a paying member that can enjoy unlimited drives tracking per month. Following this button will take the user to the environment-specific payment process (as of July 2014, examples include the Apple App Store or Android Market as well as an online payment gateway).

The upper portion of the Drives screen is the three-element dashboard that communicates the monthly statistics of usage to the user. It consists of the month name, the total number of drives that system has registered for the user that month (403), a digital graphic that may reference a car's odometer (401) in order to give a full count of all the miles a user has driven for the specific month, and a sum of all the monetary value of the user's activity for the month (415).

As an example, in FIG. 4B, for speed of classification, a user can touch any part of the card and drag it right (439) to classify it as "business" and to the left to classify it as "personal" (437). The opacity of the card changes as a function of the horizontal position of the moved card, and card is always kept at a fixed vertical position once the sliding has been initiated. If the card is not perturbed sufficiently, for example 30% to the left, determined by user-testing on the specific hardware, to either the left or the right, the card will snap back to the original middle position once the touch and drag interaction has been finished by the user. If the card is sufficiently moved to either side then, upon the completion of the touch and drag interaction of the user, the card will animate completely off the screen and the whole list of cards will animate upward (443). The value displayed to the user in (441) will immediately update accordingly (process of determining drive monetary value described in FIG. 5).

In an example, shown in FIG. 4C, the "back" (449) of the card is accessed by "flipping" (447) the card using the details button (413). From there, the user can input any parking fees (451), tolls (453), vehicle name (455) or miscellaneous notes (457), or any other details deemed useful in the process of managing the user's drive history.

As an example, a user might drive from Palo Alto, CA to San Francisco, CA. Providing that the user has the phone in the car with them, the system will automatically determine the drive and add the card into Drives interface as the top card in the vertical scroll of cards. If the user had paid a $10 fee to park in the city, he would go to the back of the card via the details button (413) to insert "$10" into item (451).

FIG. 5 describes the method by which the drive classification event is taken from the user interface as described in FIGS. 4 and 8. The specific drive and new designation (either "business" or "personal") is passed into a function that queries a database (503) to determine the value—the value may be based on tax reimbursement requirements of a specific vehicle type and/or geography or it might be based on a user or company set of rules. Note that (503), (505) and (507) may reside either on the local device, on a remote server or any other place that ensures the maximal response time for the user interface to updated (509) with the appropriate information. Step (507) applies the stored value for the user's drive and then ensures that both the local databases and the remote database, accessible via a network, (509) and the user's experience are updated. This reimbursement value can later be updated by the user.

In some embodiments, the events denoted in FIG. 4B (437) or (439), or in FIG. 8, a user selecting an option enumerated in (839), could create the classification event 501 in FIG. 5.

In some embodiments, for example on a mobile device in which the User Database (503) might reside locally, the User Database may be periodically synchronized with the network (511) to ensure the correct monetary values. In some embodiments, the user may elect to set customized rates for "business" and "personal." In some embodiments, the government or company rates might change, and the User Database will maintain synchronicity.

As an example, a user classifies her drive from Palo Alto, CA to San Francisco CA. She tracks her miles to expense to the US Government. When she classifies the drive on her mobile phone (443), the Determine Value Step (505) queries a database saved on the device (503) to get the correct mileage reimbursement rate for that particular year. Once that value is acquired from the database, the mobile phone updates the values as described in FIG. 4B).

The system to persistently monitor use telemetry of mobile devices is described in FIG. 6. The system may be predicated on two primary ideas: to only send one unit of data (601) when the mobile device has finished physically moving from one location to another and to ensure that the monitoring system is chronically active (603 and 609).

To define terms, "OS" refers to Operating System of a particular hardware configuration and "arrival" refers to the moment at which the system recognizes that a person is staying at a particular location for a minimum of a few minutes. An "arrival" in this terminology means that the telemetry data available to our system and the larger ecosystem in which our system exists in (i.e., Apple iOS, Android OS, web browser, our dedicated hardware system, etc.) is sufficient for our algorithms to determine that the mobile device is physically on the user or in a vehicle. In an example, the mobile device has arrived at a specific location (619). "Raw Movement Data" (601) consists of all telemetry data taken between the mobile device's departure from the last arrival point and the data leading up to the moment at which the system recognizes that the user has arrival, potentially including, but not limited to, accelerometer, magnetometer, gyroscope, GPS, cellular signal strength, and battery level. "Firmware Ecosystem" (617) describes a firmware containing hardware and/or software in an example. In an example, the term should include, but is not limited to, devices that match the description of physical hardware in FIG. 2, the containing operating system on which this technique runs, and the Software Development Kit (SDK) provided by that operating system to directly interact with the algorithms mentioned herein. The operating system is, but not limited to, the Android Operating System (owned by Google, Inc.) and the iOS operating system (owned by Apple). In the context of the chronic drive monitoring, two of the environment-level events are, but not limited to, geo-fence events and pause or shutdown indicators.

While the system is running, (605) will periodically measure, via a set of internal timers, the telemetry data (02) on the device on the order 1 Hz: including, but not limited to accelerometer, magnetometer, gyroscope and GPS, and store to a local data cache (615) that resides on the physical hardware held by the user. Should the arrival be determined in step (607), the data cache pulled from the device and packaged into the Raw Movement Data (601).

In an embodiment, when the system first starts monitoring location (as an example, when the user first starts the application or when the phone is powered on), it immediately begins to monitor the telemetry data (605) and after a period of time, calculating to check for an "arrival" (607) by evaluating trained heuristics using, in some embodiments, the time-series magnitude of the sensors (enumerated above in the content of Raw Movement Data 601), frequency-domain information of the telemetry and the available GPS results. In addition, the mobile operating system providers (enumerated above) may provide a proprietary intelligence layer on top of their telemetry SDK, in which case higher-level results (for example, declaring the phone's motion state as "walking" or "stationary"). In an embodiment, this raw telemetry data and OS-level derivative results, may all be incorporated into a dynamic decision-tree algorithm to determine the user's arrival.

If (603) determines that the device has not arrived, then it must check if the containing ecosystem (described above) is likely to be stopped by the system (609). By convention, mobile operating systems apply constraints upon the background operation of apps not in active use by the user, so the technique must monitor the likelihood of being shut down or paused (611) by the OS. For example, if these operating environments determine insufficient movement of the physical hardware, the OS can shut off access either to the telemetry or pause the processing of the a particular application. The technique is customized to the operating environment in order to facilitate constant operation. In an embodiment, this determination of a likely shutdown event can be determined by, but not limited to, internal times set by the app, queries to the OS SDK to determine allotted time remaining and physical movement of the device which has been empirically correlated with phone shutdown events. On the determination of an imminent or likely shutdown from the operating system pause or shut down of the application, the system deploys a geofence or any other mechanism for creating a reference to the current location. This is necessary because, should the technique be shut down, it is convention of the encompassing ecosystems that the breaking of the geofence will allow system that set the geofence to resume running (613).

In an example, a geofence is, by convention, an operating system-level software subsystem that registers a physical geolocation and a desired radius; if the physical hardware of the phone is determined to have a physical location that is a greater distance than the radius from the specified location, then geofence is said to have "been broken" and an event is passed from the operating system to the target application. This is necessary because, should the technique be shut down, it is convention of the encompassing ecosystems that the breaking of the geofence will allow application that set the geofence to start running again, continuing to monitor the data from the point of the shutdown or pause event (613).

In the event of a geofence being broken (613) when the device is a known arrival state, then there is a "departure" notification sent to the processing server (described in FIG. 7) via a communication network (621).

FIG. 7 describes the system by which the Raw Movement Data (707), Departure Notification (705) and Drive Feedback (711) from the User Device can be processed. Note that the user device may be any of a mobile tablet, phone, vehicle.

UserDB:
includes payment information and drive history.
Time+LocationDB:
anonymized global data to be used in calculation of classification prediction.
Public Transits:
Storing routes that are known to not be drives via data created through the system.

Once the Raw Movement Data (705) has been successfully transferred into the processing System via a network, the Processing System will then hold the raw movement data in a check (715) for other legs of the same journey and merging multiple pieces as appropriate. In an embodiment, this is a timer-based system that listens for Departure Notifications (705) from the user device. As an example, a driver is stuck at a long traffic jam which triggers the arrival event (619), so two Raw Data Objects would be merged in (715). After the check that all relevant portions of the transit are considered, the raw data object (705), which is now possibly a merged result of multiple Raw Movement Data objects, is passed through a succession of filters to ensure that it is indeed a drive.

In an alternative example, once the Raw Movement Data (705) has been successfully transferred into the processing System via a network, the Processing System will then hold the raw movement data in a temporary store system to check (715) for other legs of the same journey and merging multiple pieces as appropriate. In an embodiment, this is a timer-based system that listens for Departure Notifications (705) from the user device while storing the most recent Raw Movement Data object in a temporary, yet persistent, database. As an example, a driver is stuck at a long traffic jam which triggers the arrival event (619), so the system would see the first Raw Movement Data, and before the timer runs out to continue on to the following step (717), the Departure Notification arrives indicating that the user has moved from the arrival location, and upon the user's arrival to the desired location, the two Raw Movement Data objects would be merged in (715). After the check that all relevant portions of the transit are considered, the raw data object (705), which is now possibly a merged result of multiple Raw Movement Data objects, is passed through a succession of filters to ensure that it is indeed a drive.

The first step is to consider the telemetry data (717), starting with the location of the drives. In this context, "discard" refers to marking the candidate transit data as "not a drive" and removing it from consideration as a drive, but persisted into an aggregate database (729) for further statistical analysis. The telemetry check is the following:

1. Check the distance between the end points (measured either as the distances of two points on the surface of a sphere or by driving route distances calculated by a service provider such as Google Maps);
2. As the system sets a minimum distance for the drives, if the physical distance between the two locations is under a certain threshold, the drive is discarded;
3. In an embodiment, the system will then evaluate all intermediate geolocations included in the Raw Movement Data object and search for an intermediate geolocation that maximizes the sum of distances between the start location, an intermediate geolocation and the ending location. If this sum of distance is beyond a specific minimum threshold, then the Raw Movement Data is kept as a candidate drive. This particular check is to ensure that round trip drives, i.e., those that start and end at the same location, are still kept in consideration.

If the distance is too long for a drive (determined statistically over the history of drives in the database (729), such as from an airplane flight, the drive is discarded).

The next step is to confirm whether or not the candidate dataset is indeed a drive (719) by removing the possibility of other modes of transportation. If the drive is registered as a short enough distance to be statistically reasonable to be a walk, a bicycle trip, or any other form of manual transport, the system runs a statistical analyses based on the motion information (including, but not limited to, accelerometer, gyroscope, magnetometer). If the candidate drive fails this test, it is discarded. If the candidate transit passes this filter, then the last step is to compare the telemetry data to ensure that the transit is not a public transit route by referencing data from the Public Transit Database (725), which is a combination of publicly available information and aggregate user feedback (711). If the candidate transit has passed these examinations, then a drive object will be created and candidate transit data will be marked as successfully processed.

Once the drive object has been created, the system determines whether the user has either paid for unlimited drives or if the drive is within the free monthly quota (721).

Finally, the system utilizes the data from previous user actions (723)—including, but not limited to, drive classification and manual user drive deletion with additional metadata for the reason of deletion—via a combination of anonymized aggregate data (729) and specific history of the user (727) to generate a statistical estimates of the various drive classifications. In an embodiment, a method such as, but not limited to, the Naive Bayes classifier may be employed. That is, by monitoring the "global" statistics of drive classification as a function of such parameters as (but not limited to) time of day, known prior classification for drives originating or ending at given location, and publicly available knowledge of particular locations from which the drives originate or conclude, and "user specific" statistics such as user history of drive classifications as a function of time and location, the system is able to calculate a probability of all drives. The Naive Bayes approach is to assume conditional independence across the aforementioned statistics, which, while assisting in the computational complexity, is only one of several other methods for inferring probability of a novel drive object. Using feedback from users regarding accuracy of the resulting classification inference, the system then learns the threshold beyond which the system's automatic classification. By way of example, if a user's latest drive is deemed 95% likely to be a work drive given that it was started at 3 pm on a Wednesday and both started and ended at a locations that had previously been included in drives that the user manually identified as "Business", than the system can automatically classify the drive "Business" and notify the user appropriately.

If the original Raw Movement Data object has passed all tests, then a new Drive object is created, with a reference to the original raw data, and the rest of the application system is alerted of the drive via network (713) communication.

In an embodiment, the User Device could be a vehicle with hardware including RAM memory (701), a Processor (703) and means to connect to network (713) which allows it to send both Departure Notifications (705) and Raw Movement Data. The data may be processed through the same methodology as mentioned previously, with the additional knowledge that the data source is a car simplifying the step of verifying that the transit is indeed a drive in step (719).

In alternate embodiments, the source of the drive data can be the user's vehicle, in which case the confidence level will be higher of whether transit is a drive but the remaining steps of the process for determining purpose, for instance, will still apply.

FIGS. 8A, 8B, 8C, 8D, and 8E describes the four part web system for the user: a utility tool bar (801), a visual overview of the user's activity (803), an enumeration of the drives' most critical pieces of information (807) and a section of primary activity for the user's drives.

The utility toolbar provides basic navigation functionality and account information for the user. The "Year in Review" (837) button allows the user to select a year for which they want to download high-level drive summary information. The user's account email address (835) provides the functionality for the user to log out of the web system and also to access additional user settings, with some examples including: the ability to name and store vehicles; choose miles or kilometers for logging purposes; set business hours for auto-classification; define custom purposes for drives; set custom reimbursement rates; and name frequently visited locations (ex. Office) or routes. For non-paying users a call to action to "Get Unlimited Drives" (833) provides the user a quick path to upgrade to an unlimited-drive paid subscription.

The visual overview is made of the sum of total mileage over a fixed time period (803), the sum of miles that been determined as "business" (N) and a graphical representation of the user's activity (35). Specifically, (803) shows the ratio of total miles to designated business miles per day, with the design of motivating the user to classify all available miles. The visual overview may be updated by selecting a different time frame granularity (daily, weekly, or monthly), a different metric to display (Distance, Value, or Reported), each of which displays a ratio of total to those that have been classified as business.

On the primary portion of the page, each drive is listed as a row in a table with its "Purpose", "When", "Where", "Miles", and "Value" (807). "Purpose" for a drive represents the classification of each drive as a "Business" drive (80) or a "Personal" drive, and thereby indicates which drives are eligible for deduction or reimbursement. These purposes can get added specificity by choosing from a pre-set list of options or from a user or company defined set of purposes. Certain classifications of personal drives may also qualify for deduction or reimbursement and are represented by an accompanying "$" symbol in the category list. When the user classifies a drive as a Business drive or a Personal drive that qualifies for deduction or reimbursement, the Value (845) of that drive is immediately updated in the corresponding row for that drive, as is the information displayed in the visual overview (803).

The "When" value is determined by the starting time of the drive. The "Where" (811) text is determined by the following ruleset. If City A is not equal to City B, then the "Where" text may read "City A to City B". If City A is equal to City B, then the system may check Neighborhood X and Neighborhood Y. If Neighborhood X is equal to Neighborhood Y, then the Where text may read "Neighborhood X [Local]". Else, the text will read "Neighborhood X to Neighborhood Y". In alternate embodiments, this could also be street names or location names as defined by the user or defined automatically by matching coordinates to databases of public and/or private locations.

Clicking on "When" or "Where" information for a single drive reveals the "Add Drive Details" (851) dialogue which provides the user a mechanism to add drive details to a new drive or edit the details that have already been input to an existing drive. An embodiment of this experience is described in FIG. 8E. In this embodiment, certain elements of the drive details such as date, distance (853), and start and stop location (867) and time cannot be edited by the user, while some fields can be edited. Certain fields can be edited including "Purpose" (855), "Vehicle", "Parking", "Tolls", "Notes", and "Distance", so the user can fine tune the details of the drive. In alternate embodiments, different combinations of details can be edited by the user, such as changing a drive route or adjusting the starting or ending location. The "Value" (866) of the drive will update accordingly when "Parking", "Tolls", or "Distance" are updated, as they all impact the deductible value of the drive. The user may also click "Undo" (859) to remove any changes that have been entered during the current editing session, or click "Delete" (857) to completely remove the drive from the drive table. The user can advance to the next or previous drive quickly by clicking the arrow on the left or right side of the "Add Drive Details" dialogue, provided there are additional drives in the drive log, which is indicated by the drive count below the dialogue (861). When all drive details are to the liking of the user, the user can press "Save" (863).

Because of the volume of the items that a user will have to manage, the system provides a set of filtering tools (813) and a search bar (805). The filtering tools are designed around the user workflow: identifying drives that need to be classified, drives that have been classified as Business, and drives that have been classified as Personal. The search bar (805) provides live search on certain drive data including "Purpose", "Location", "Notes", and "Vehicle" data. In alternate embodiments, the search functionality can include date limiters or other advanced search options including AND and OR functions.

At any point, the user can visualize and review their prior reports via the report history button (837).

The activity toolbar (13) positioned fixed at the bottom of the drive table provides additional tools for the user to update, categorize, and manage their drive information. "Add+" (815) produces a dialogue that allows the user to manually add a drive to their drive log by specifying details about the start and end points of the drive as well as the time. In alternate embodiments this can be done by text input or using a trackpad or other hardware device to identify on a map a starting point, ending point, and/or drive route. Upon entering this information the user advances to the "Add Drive Details" (FIG. 8E) dialogue to finish entering additional drive details (as outlined above).

"Edit 1-by-1" (817), "Edit Group" (819), and "Join" (821), "Delete" (823), and the Report Drives button (825) are all options that require the user to first select one or more drives from the drive log by clicking the check box on the left side of the drive row. "Edit 1-by-1" queues up only the selected drives into the "Add Drive Details" (FIG. 8E) editing "carousel", allowing the user to quickly make sequential edits to the selected drives. "Edit Group" (819) provides a dialogue that allows the user to bulk-edit drive details, applying (and overwriting) the updated values to all of the selected drives. "Join" (821) provides functionality for the user to combine two or more drives into a single new drive. The resulting joined drive will use the starting location of the oldest drive (by date) in the selection, and the end location of the newest drive, and miles will be calculated by adding the miles of each drive, not by the total distance between the start and stop location. Upon joining the drives, the original selected drive records will be deleted. "Delete" gives the user a way delete one or more drives with a single click.

When one or more classified drives are selected in the drive table, the "Report Drives" (825) button at the right side of the activity toolbar activates (849), showing the total value of the selected drives on the button itself. Clicking the button displays a dialogue that allows the user to select their preferred reporting format, either a file to download to their computer (like CSV or PDF), or to an accounting system (like Concur or Fresh Books). Prior to clicking "Report" to execute the report creation, the user can enter additional optional information to be populated into the report including notes to be applied to all drives or custom rates to be applied to all drives in the report. If the user selects "Mark these drives reported", the drives will no longer show up in the default view of the drive log table.

In alternate embodiments, a user's drive history can be shown as a calendar view as opposed to a list view. In other alternate embodiments, the drive cards can be shown in a tiled or other scrollable view.

FIG. 9 shows the user experience for setting classification rules as a function of time of drives. As an example, if the customer is a courier who is only able to expense mileage between 8:00 am and 5:00 pm on weekdays, but knows that every drive he makes during that time window is a drive that he would expense, then he can establish rules for auto-classification. Similarly, a user who only uses their vehicle for personal use on weekends could choose to have all drives after 8 pm on Friday and before 7 am on Monday automatically classified as Personal. In alternate embodiments the user could also choose to have their automatically classified drives discarded.

The user enables rules for a particular day (903), a start and stop time (901), and the rules are automatically saved into the user's account.

FIG. 10 is a simplified flow diagram of the user account types as it corresponds to drive addition to a specific user account in an example. The technique may use a two-tier system to partition the user: an "unpaid" status and a "premium" account. In an embodiment, these two designations are associated with the calendar month. An unpaid user is given a quota of free drives per month, beyond that quota the drives will be stored in the system but will not be available to the user until that user upgrades his account to premium. An association with the calendar months means that, in the case of the unpaid user, the user's drives that are counted towards his monthly quota will go back to zero. By way of example, if the quota was 40, a user could automatically track 40 drives per month indefinitely without having to upgrade his account.

By way of example, each drive is registered (1003) after a user creates their account (1001) and counted towards a monthly sum, persisted in the User Database (727). For every drive that is registered, the system will check if the user's account status is premium (1005): if it is premium, then all drives are immediately added to the user's account. If the user is "unpaid", then the system will check the sum of all drives for that user for that calendar month, and if the total sum is less than the quota, then the user will receive that drive in their account.

In the case of an unpaid user registering a drive that is over quota, the drive will be stored in the User Database (727), and upon the user account upgrade, the drives may be added into the user's accessible account.

The interface shown herein is implemented in responsive HTML, which means that the interface adapts to the physical hardware (i.e., screen size) to make sure that the fundamental interaction paradigm is preserved across various viewing dimensions.

In an example, the method includes swiping a portion of the graphical representation of the drive via a touch input, voice input or coupled to the display, or a voice command to move the graphical representation in one of a plurality of directions outside of the display. Each of the directions is indicative of a classification associated with the drive. The method includes adding the number representative of the distance to a total associated with the category. In an example, the classification is done by swiping a portion of the graphical representation via a touch input to move the graphical representation in one of a plurality of directions. In an example, each of the directions is indicative of a classification associated with the route. In an example, the classification is done by voice command. In an example, the classification is done on a computer using a graphical user interface. In an example, the classification is done based on any combination of computer algorithms and user-defined rules for automatic classification.

In an example, the initiating, using, moving, using, identifying, and outputting are provided free from input from a user of the mobile wireless device. In an example, the one or more legs are joined or configured together in the drive or route using mapping information and/or the traffic data derived from a third party information source. In an example, the method further comprises using information from a calendar program to identify a purpose of the drive route.

In an example, the method includes using credit card information from a purchase using the credit card within a time frame associated with the drive route to identify a purpose for the drive route. In an example, the graphical representation of the drive route is output as a card associated with the drive or route. In an example, the potential value of a drive is shown automatically on the drive card, which is displayed. In an example, the card on the display can be expanded to reveal additional detail needed for recordkeeping purposes.

In an example, the method comprises outputting a plurality of other graphical representations of another drive or route numbered from 2 through N, where N is an integer greater than 2, whereupon the outputting is provided in a sequential manner from a first card associated with the first drive or route to an Nth card associated with the Nth card. In an example, the swiping is provided using a single hand of a user. In an example, the method includes displaying cumulative total information representative of distance. In an example, the method includes outputting a plurality of other graphical representations of another drive or route numbered from 2 through N, where N is an integer greater than 2, whereupon the outputting is provided in a sequential manner from a first card associated with the first route to an Nth card associated with the Nth card, each of the cards being outputted separately from the other cards.

In an example, the method includes selecting an indicator associated with the drive or route, and switching to a graphical input screen, the graphical input screen having one or more fields to input a detail of the route; and storing the graphical input screen with the input with the route. In an example, the method includes outputting a monetary value associated with the drive or route: and outputting a cumulative monetary value associated with a predetermined time frequency of use. In an example, the method includes automatically classifying the drive route based upon a time of day or automatically classifying the drive based on preferences set by the user or automatically classifying the drive based on past classifications by the user, or any of these combinations, and the like.

In an example, the method includes enabling the user to name a location and display that name thereafter when that location is shown. In an example, the method includes enabling the application to automatically classify a drive to a location based on the name the user gives it or based on past classification of a drive to that location by a user. In an example, the method includes automatically classifying the drive route based upon one or more locations. In an example, the method includes communicating information using Bluetooth pairing from a vehicle to the application via a Bluetooth communication device.

In an example, the method includes inputting toll data associated with the drive or route based upon either map data or an electronic toll payment. In an example, the method includes inputting parking information based upon credit card information, a parking application, or mapping data. In an example, the method includes downloading or transferring a report associated with the application via email or other communication device. In an example, the report has the summary information required to prepare tax filings or submit to an employer for reimbursement. In an example, the summary information includes some combination of business classified miles, personal classified miles, commute classified miles, parking expenses and toll expenses. In an example, the summary information is ordered by user vehicle.

In an example, the method includes converting a monetary measurement based upon a geographical location identified by the application program. In an example, the method includes converting a distance measurement based upon a geographical location identified by the application program. In an example, the default value of the drives is determined based on the geographic location of the wireless mobile device such as the province in Canada that the user works from. In an example, the default value of the drives is determined based on information about the user's vehicle or cumulative distance traveled for the year such as in the United Kingdom where the first 10,000 miles are valued differently than all miles thereafter for a vehicle in a given tax year. In an example, the default value is determined based on inputs from a third party software tool that provides governmental or corporate mileage rates. In an example, the default value of the drives is determined based on the user's input of default values for said user's drives. In an example, the application automatically calculates the percentage of a user's drives for a year or other time period that are included as business drives based on past classification percentages. In an example, the user can choose to receive daily, weekly or monthly reports delivered to them automatically by the application with summary and/or specific drive details. In an example, the service is sold as a subscription on a monthly or annual basis. In an example, the service is priced as a percentage of user's drives or monies classified or reported. In an example, the service is provided free of charge on an ongoing basis but the number of drives a user can see in a given time period is limited if they have not purchased a subscription.

In an example, the present techniques also includes the following: A user is someone who has installed the mobile application (referred to as "the app" going forward), on their phone, has launched the application, and has successfully created a user account then has access to the web dashboard (referred to as "the dashboard" going forward). The dashboard replicates and extends the functionality of the app, allowing the user to edit drives, verify information, and report or export their data to appropriate locations or systems. The dashboard is optimized and works across any sized browser. The present techniques includes one or more of the following:

In an example, the technique also provides for the following:
1. Accessing the dashboard
a. Credentials
i. User is required to create a user account in order to access the dashboard
ii. User must download the app and launch it
iii. User must complete the signup process within the app and in doing so establish an email address and password as credentials
b. Logging into the dashboard
i. User enters the domain name into their web browser, arrives at the homepage, and clicks "Dashboard login" (or similarly named) link on the website, or
ii. User enters https://dashboard.mileiq.com/into their web browser
iii. User arrives at the dashboard login screen
iv. User enters their email address and password as they were established during the signup process in the app
v. User clicks "Sign in"
1. If credentials are incorrect, screen refreshes and an error messages prompts user to re-enter credentials
2. If credentials are correct user is successfully taken to the dashboard
2. No activity
a. If user has not logged any drives using the app or has classified all drives using the app or the dashboard, the dashboard will display a message stating that there are no unreported drives to display.
3. Header toolbar
a. Clicking the logo takes user back to the homepage
b. Clicking the "Dashboard" link refreshes the dashboard
c. Clicking "Year in review" reveals a drop down where user can select a year for which they want to download summary information.
i. Selecting one of the years prompts the user with bullet points to review before downloading the summary
ii. Clicking "Download [XXXX] summary" creates a CSV file that is downloaded to the user's computer for further review, where XXXX can be 2013, 2014, and so on
d. Clicking user's email address in the header toolbar reveals an option to "Sign Out" of the dashboard, which will securely log the user out of their dashboard session
4. Stats chart—The area below the header toolbar provides high-level statistics of the user's driving activity and amount of money that has and can be deducted. The chart updates as the user modifies or edits drive information in the drive table below.
a. Upon first login the stats chart defaults to show total miles captured and total miles classified as deductible miles over the past seven days.
b. The daily/weekly/monthly selector at the bottom of the chart provides a granularity option by which to view the data. Upon changing the granularity the statistics will update and the bar graph representing groupings of time will update appropriately.
c. The distance/value/reported selector at the bottom of the chart provides the user a way to view different types of data on the graph.
i. Selecting Distance will show total miles captured in the time period specified by the selection underneath the bar chart, as well as the total miles classified as deductible business miles.
ii. Selecting Value will show the value of all miles captured within the time period specified by the selection underneath the bar chart, as well as the value of the miles classified as deductible business miles.
iii. Selecting Reported will show the value of all miles captured within the time period specified by the selection underneath the bar chart, as well as the value of the miles classified as deductible business miles.
d. Clicking the left and right arrows at the bottom of the time period selector underneath the bar chart area will progressively move through daily/weekly/monthly time periods and update the chart information as it is affected by the dates.
e. Clicking "hide chart" will hide the chart from view on the dashboard. The chart can be revealed again by clicking "show chart".
5. Drive log—The table below the stats chart is the main component of the dashboard where the user will spend their time manipulating, updating, and editing information to ensure drive information is accurate and ready to export for tax purposes or email for reporting purposes.
 a. Upon logging into the dashboard, user will be presented with a list of all drives that have been captured in the current year and have not been "deleted" or marked as reported. The default sorting for the table is by chronological order of when the drives were captured.
 b. Drives—each drive is represented by a row in the table
  i. The Purpose column shows the current purpose of each drive as defined by the user in the app or the dashboard. It shows (and highlights in blue) those drives, which have not yet been classified, indicating to the user tasks that need to be completed.
  ii. The When column shows when the drive was captured
  iii. The Location column provides a summary of the start and end location of the captured drive
  iv. The Miles column shows the user the distance of the captured drive
  v. The Value column provides the value of each drive only if it has been categorized as a business drive in the purpose column.
  vi. Clicking any column header will sort that column
 c. Classifying drives in the drive log
  i. Unclassified drives are represented by a blue button in the Purpose column with a label of "unclassified"
  ii. Clicking the button reveals a number of labels the user can take advantage of to categorize the drive.
  iii. Selecting one of the labels will save the categorization and if the drive is deductible the value of the drive will be updated in the Value column.
 d. Editing a drive
  i. To edit the details of a drive the user can click on the date/time or location of the drive in the drive log table. Alternatively the user can select the checkbox next to the drive and click "Edit 1-by-1" at the bottom of the screen
  ii. Start and stop locations of the drive are displayed. Clicking either one reveals a larger map. Map can be closed by clicking the X on the screen.
  iii. User can edit/verify/update any of the drive details including the Purpose of the drive
  iv. Clicking the X at this point will discard any changes that have been made and close the drive details
  v. Clicking Undo will revert any changes made to thus far to the drive details
  vi. Clicking Save or advancing the "drive carousel" by clicking the left and right arrows at the side of the drive details will save the information
  vii. Clicking delete will begin to the delete the drive
   1. Popup will confirm deletion
   2. User can optionally select a reason for deleting the drive
   3. After deletion the drive carousel advances to next drive for quick editing
  viii. Moving to next drive
   1. Clicking the left or right arrow on the sides of the drive details advances to the next drive in the sequence for quick editing
   2. Clicking the left or right arrow will save any changes that have been made
 e. Bulk editing of drives
  i. User can select multiple drives by clicking the checkboxes at the side of the drive rows
   1. Clicking "Edit 1-by-1" will place only the selected drives into an editing queue to allow the user to quickly edit and save only the selected drives before advancing to the next in the queue.
   2. Clicking "Edit Group" provides the user with a prompt to edit the drive details for every selected drive at one time.
    a. Summary of the selected drives is displayed for reference
    b. User may edit any of the editable values on this screen
    c. Saving the edits will apply the changes to all of the drives in the bulk edit, overwriting any previous information.
   3. Clicking "Join" gives the user a prompt asking the user if they are sure they want to join the selected drives.
    a. When joining two or more drives, the resulting joined drive will use the starting location of the oldest drive (by date) and the ending location of the newest drive, and miles will be calculated by adding the miles of each drive.
    b. Clicking the confirmation to join the two drives will result in the selected drives being deleted and a new "joined" drive being created in the drive table.
   4. Clicking "Delete" prompts the user to provide a reason for deleting.
   5. Clicking one of the reasons will delete the drives and return the user to the dashboard.
 f. Adding a drive
  i. Clicking "Add+" will prompt the user with a dialogue to manually enter drive information
  ii. User enters Start address, date, and time
  iii. User enters End address, date, and time
  iv. Clicking Add Drive creates the drive in the drive log and brings the user to the next prompt to enter drive details
  v. User can enter all drive details including drive purpose
  vi. User can save, delete, or click X to save without any details
 g. Reporting—Reporting allows the user to select a group of drives to include in a report or export to a specific location and in a specific file format.
  i. User selects drives to submit in the reporting by clicking the checkbox next to each drive that needs to be included. Only drives that are classified can be included in the report.
  ii. Selecting drives with the checkbox causes the report drive button in bottom right to update with total value of selected drives
  iii. Clicking "Report [x] Drives" button when ready presents the user with the report submission screen, where x is number of drives selected
   1. Summary of selected drives is displayed at the top of the submission screen
   2. The user can fill in optional information that will populate in the report in the Additional Info section a. Submitter: User can enter their name as the person submitting the report
b. Project: User can enter a brief description of the project if applicable
c. Customer: User can enter the name of the customer or client that this set of drives applies to
d. Email copy to: By default the report will be sent to the user. User has the option to have the report sent to additional people by entering their email addresses here
e. Checking the "Mark these drives as reported" box will remove the drive from the default view of the drive log in the dashboard
f. User can change the Business rate of the miles to get a report that accurately represents their needs
3. Export to
a. Selecting PDF or CSV as the export format will result in the user receiving a PDF or CSV report in their email
b. Selecting Concur or FreshBooks
i. User must authorize the account they choose to export to
ii. User must click report
4. User must click Report to finalize the process
5. User will quickly receive an emailed report
6. User must click OK on the confirmation prompt to continue
h. Searching
i. Entering text into the search box will initiate the instant live search functionality and will begin to return results immediately if matches are found
ii. Searching functionality searches on purpose, location, notes and vehicle information
iii. Searching functionality does not search on time, miles, value, parking, and toll information
iv. If records are found they are displayed to the user as a table of drives
v. If no records are found a message stating "No matching records found" is presented to the user
i. Filtering drives allows the user to quickly change the view of the drive log to show only certain types of drives
i. Clicking Unclassified updates the drive table to show only drives that have not yet been classified
ii. Clicking Business updates the drive table to show only drives that are classified as Business
iii. Clicking Personal updates the drive table to show only drives that are classified as Personal
iv. Clicking All updates the drive table to show all drives
v. Selecting the "Include reported drives" box will allow the filtered results to also show drives that you have already marked as "Mark these drives reported" during a previous Report.
j. Report History
i. Clicking Report History shows the user all reports that the user has created along with high-level details
ii. Clicking the "+" symbol on the left side of each report will expand the item to show the specific As used herein, the terms "first" "second" "third" and "nth" shall be interpreted under ordinary meaning. Such terms, alone or together, do not necessarily imply order, unless understood that way by one of ordinary skill in the art. Additionally, the terms "top" and "bottom" may not have a meaning in reference to a direction of gravity, while should be interpreted under ordinary meaning. These terms shall not unduly limit the scope of the claims herein.

While the above is a full description of the specific embodiments, various modifications, alternative constructions and equivalents may be used. As an example, the packaged device can include any combination of elements described above, as well as outside of the present specification. Therefore, the above description and illustrations should not be taken as limiting the scope of the present invention which is defined by the appended claims.

The invention claimed is:

1. A portable electronic device comprising:
one or more processors;
a sensor comprising at least one of an accelerometer, a gyroscope, a magnetometer, or a global positioning system (GPS) sensor;
a non-transitory, processor-readable storage medium comprising one or more programming instructions thereon that, when executed, cause the one or more processors to:
determine, via output of the sensor, that the portable electronic device is in motion;
differentiate, without user input, between the motion corresponding to a drive and the motion corresponding to a non-driving activity;
automatically track a start point of the drive;
track movement of the portable electronic device from the start point through one or more legs of the drive;
identify a stop point of the drive;
capture a drive distance of the drive between the start point of the drive and the stop point of the drive; and
automatically classify the drive distance to establish whether a purpose of the drive is for a business purpose or a personal purpose;
output, on a display of the portable electronic device, a graphical representation of the drive.

2. The portable electronic device of claim 1, wherein the automatic classification of the drive is displayed to a user as a selection to either accept or change the automatic classification.

3. The portable electronic device of claim 2, wherein the storage medium stores the selection by the user of the automatic classification of the drive for a future automatic classification.

4. The portable electronic device of claim 2, wherein the drive is captured in a real time and the user selection to either accept or change the automatic classification is after the drive is captured.

5. The portable electronic device of claim 1, wherein the classification of the drive is based on a hi story of a driver's behavior.

6. The portable electronic device of claim 1, wherein the classification of the drive is a multi-class classification system that automatically classifies the drive based on a calendar event and the drive distance.

7. The portable electronic device of claim 1, wherein the classification of the drive is a multi-class classification system that automatically classifies the drive based on at least one credit card expense and the drive distance.

8. The portable electronic device of claim 1, wherein the classification of the drive is a multi-class classification system that automatically classifies the drive based on a current location being associated to a prior location having a previous classification.

9. The portable electronic device of claim 1, wherein the classification of the drive is a multi-class classification system that automatically classifies the drive based on a tax rule.

10. A method for capturing a vehicle mileage information, the method comprising:
detecting, by at least one sensor of a portable electronic device, at least one of motion or location, the at least one sensor including an accelerometer, a gyroscope, a magnetometer, or a global positioning system (GPS) sensor;

determining, via output of the at least one sensor, that the portable electronic device is in motion;

differentiating, without user input, between the motion corresponding to a drive and the motion corresponding to a non-driving activity;

automatically tracking a start point of the drive;

tracking movement of the portable electronic device from the start point through one or more legs of the drive;

identifying a stop point of the drive;

capturing the vehicle mileage information of the drive between the start point of the drive and the stop point of the drive; and automatically classifying the vehicle mileage information to establish whether a purpose of the drive is for a business purpose or a personal purpose, outputting, on a display of the portable electronic device, a graphical representation of the vehicle mileage information.

11. The method of claim 10, wherein the automatic classification of the drive is displayed to a user as a selection to either accept or change the automatic classification.

12. The method of claim 11, wherein the storage medium stores the selection by the user of the automatic classification of the drive for a future automatic classification.

13. The method of claim 11, wherein the drive is captured in a real time and the user selection to either accept or change the automatic classification is after the drive is captured.

14. The method of claim 10, wherein the classification of the drive is based on a prior knowledge of a driver's behavior.

15. The method of claim 10, wherein the classification of the drive is a multi-class classification system that automatically classifies the drive based on a calendar event.

16. The method of claim 10, wherein the classification of the drive is a multi-class classification system that automatically classifies the drive based on at least one credit card expense.

17. The method of claim 10, wherein the classification of the drive is a multi-class classification system that automatically classifies the drive based on a current location being associated to a prior location having a previous classification.

18. The method of claim 10, wherein the classification of the drive is a multi-class classification system that automatically classifies the drive based on a tax rule.

19. A portable electronic device comprising:
one or more processors;
a sensor comprising at least one of an accelerometer, a gyroscope, a magnetometer, or a global positioning system (GPS) sensor;
a non-transitory, processor-readable storage medium comprising
one or more programming instructions thereon that, when executed, cause the one or more processors to:
determine, via output of the sensor, that the portable electronic device is in motion;
differentiate, without user input, between the motion corresponding to a drive and the motion corresponding to a non-driving activity;
automatically track a start point of the drive;
movement of the portable electronic device from the start point through one or more legs of the drive;
identify a stop point of the drive;
capture a drive distance of the drive between the start point of the drive and the stop point of the drive;
automatically classify the drive distance to establish whether a purpose of the drive is for a business purpose or a personal purpose;
display the automatic classification of the drive to a user as a first selection to either accept or change the automatic classification; and
display an expense associated with the classification of the drive to the user as a second selection to either accept or change the expense associated with the classification.

20. The portable electronic device of claim 19, wherein the storage medium stores the first and second selections by the user of the automatic classification of the drive and the expense associated with the classification of the drive for a future automatic classification.

* * * * *